(12) United States Patent
Rottler et al.

(10) Patent No.: US 10,394,429 B2
(45) Date of Patent: Aug. 27, 2019

(54) SHARING OF USER INTERFACE OBJECTS VIA A SHARED SPACE

(75) Inventors: Benjamin Andrew Rottler, San Diego, CA (US); Pilar Ariella Strutin-Belinoff, San Diego, CA (US); Lindsay J Metcalfe, San Diego, CA (US); Itai Vonshak, Palo Alto, CA (US); Velma Velazquez, San Carlos, CA (US); Chadwyck Wirtz, Sunnyvale, CA (US); Suresh Arumugam, Los Gatos, CA (US); Greg Arroyo, Sunnyvale, CA (US); Itay Levin, Giv'atayim (IL); Alex Rapoport, Moshav Tal Shahal (IL)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 14/409,302

(22) PCT Filed: Jun. 29, 2012

(86) PCT No.: PCT/US2012/044868
§ 371 (c)(1),
(2), (4) Date: May 26, 2016

(87) PCT Pub. No.: WO2014/003781
PCT Pub. Date: Jan. 3, 2014

(65) Prior Publication Data
US 2016/0334967 A1    Nov. 17, 2016

(51) Int. Cl.
*G06F 3/0484*    (2013.01)
*G06F 3/0486*    (2013.01)
(Continued)

(52) U.S. Cl.
CPC ........ *G06F 3/04842* (2013.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS 7,620,902 B2    11/2009  Manion et al.
8,751,493 B2 *   6/2014  Procopio .......... G06F 17/30126
                                                            707/736
(Continued)

FOREIGN PATENT DOCUMENTS

CN    1705928 A     12/2005
CN   101542459 A     9/2009
(Continued)

OTHER PUBLICATIONS

International Search Report and Written Opinion—PCT/US2012/044868—ISA/EPO—dated Feb. 25, 2013.

*Primary Examiner* — Nhat Huy T Nguyen
(74) *Attorney, Agent, or Firm* — Norton Rose Fulbright LLP

(57) ABSTRACT

Example embodiments relate to sharing of user interface objects via a shared space in a data sharing application. In example embodiments, a data sharing application provides a shared space. A user command may then be received to transfer a respective UI object from each of a plurality of applications to the shared space. In response, each transferred UI object may be displayed within the shared space, such that each displayed UI object retains associated functionality from the corresponding application within the
(Continued)

shared space. Finally, each UI object in the shared space may be shared with a plurality of users granted access to the shared space.

14 Claims, 22 Drawing Sheets

(51) Int. Cl.
*H04L 29/06* (2006.01)
*G06Q 50/00* (2012.01)
*G06Q 10/10* (2012.01)
*G06F 3/0481* (2013.01)
*G06F 3/0482* (2013.01)
*H04L 29/08* (2006.01)

(52) U.S. Cl.
CPC ......... *G06F 3/04817* (2013.01); *G06Q 10/10* (2013.01); *G06Q 50/01* (2013.01); *H04L 67/10* (2013.01)

(56) References Cited

U.S. PATENT DOCUMENTS

| | | | |
|---|---|---|---|
| 2003/0046134 A1* | 3/2003 | Frolick | G06Q 10/063118 705/7.17 |
| 2008/0114844 A1 | 5/2008 | Sanchez et al. | |
| 2008/0288499 A1 | 11/2008 | Choi et al. | |
| 2010/0162206 A1* | 6/2010 | Roth | H04N 5/33 717/106 |
| 2010/0250683 A1 | 9/2010 | Hoyne et al. | |
| 2012/0110052 A1* | 5/2012 | Smarr | H04W 4/21 709/201 |
| 2013/0332856 A1* | 12/2013 | Sanders | G06F 3/0481 715/753 |

FOREIGN PATENT DOCUMENTS

| | | |
|---|---|---|
| CN | 101785221 A | 7/2010 |
| KR | 100989122 B1 | 10/2010 |
| KR | 20110063410 A | 6/2011 |
| WO | WO-2010115665 A1 | 10/2010 |

* cited by examiner

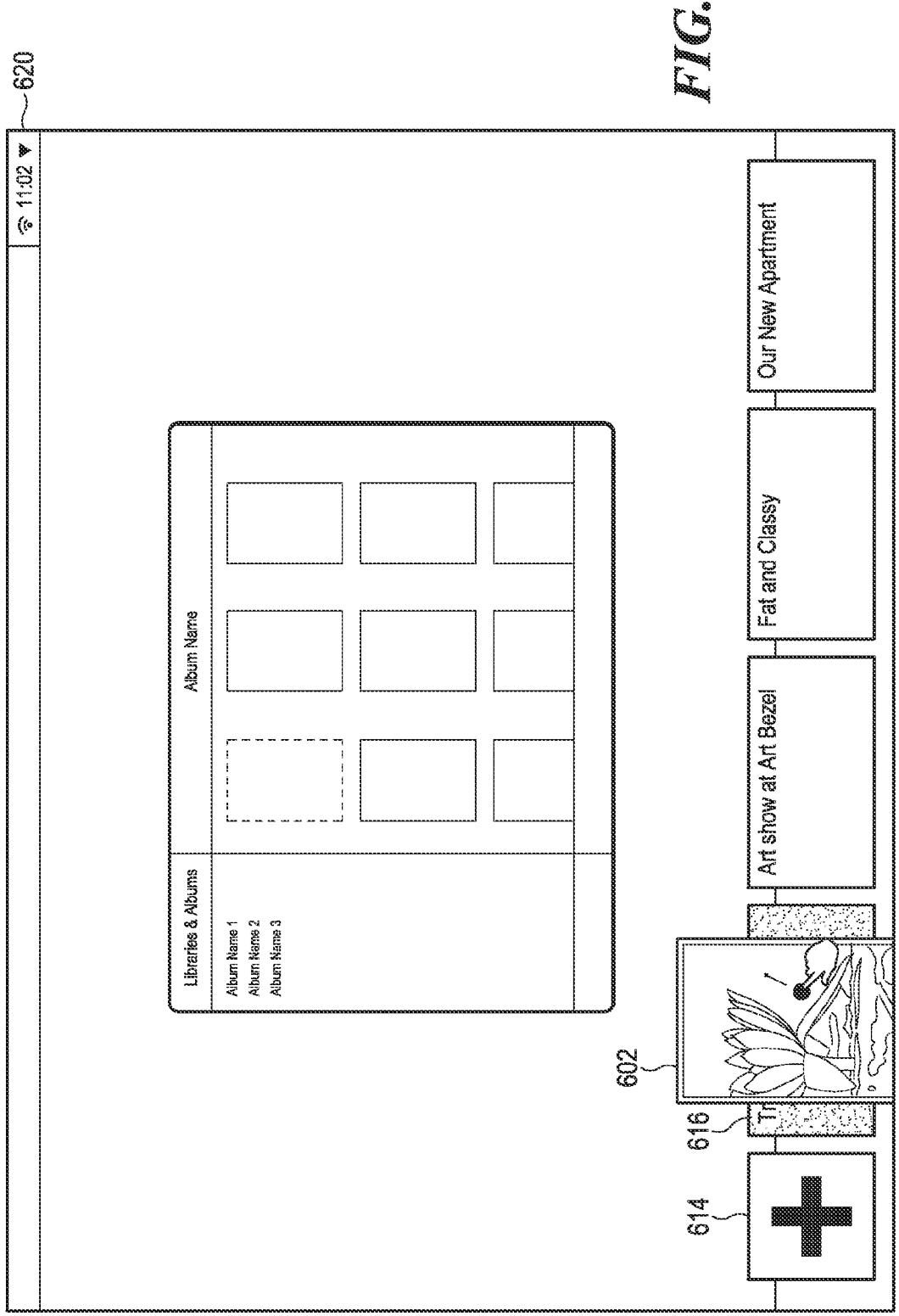

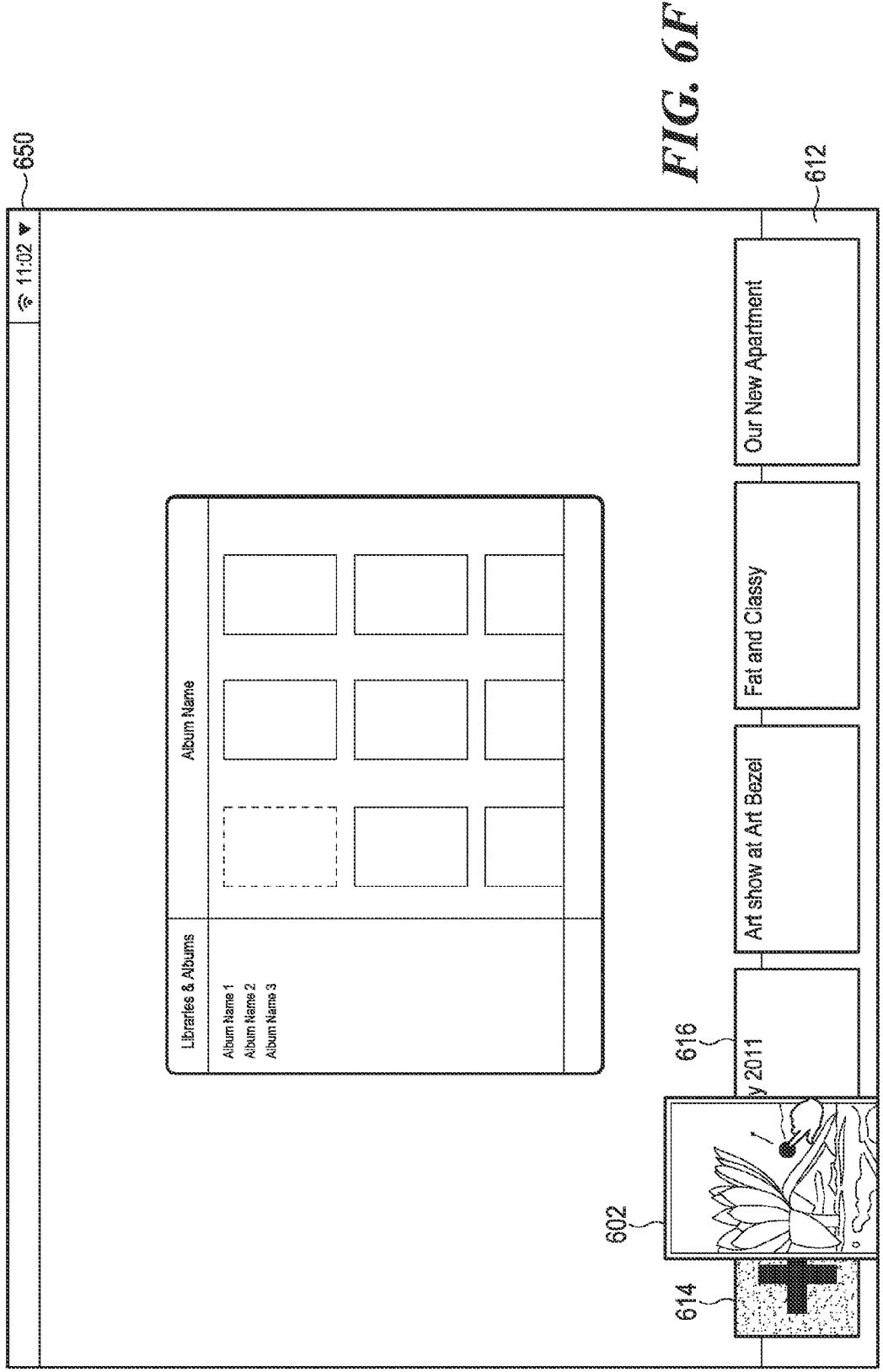

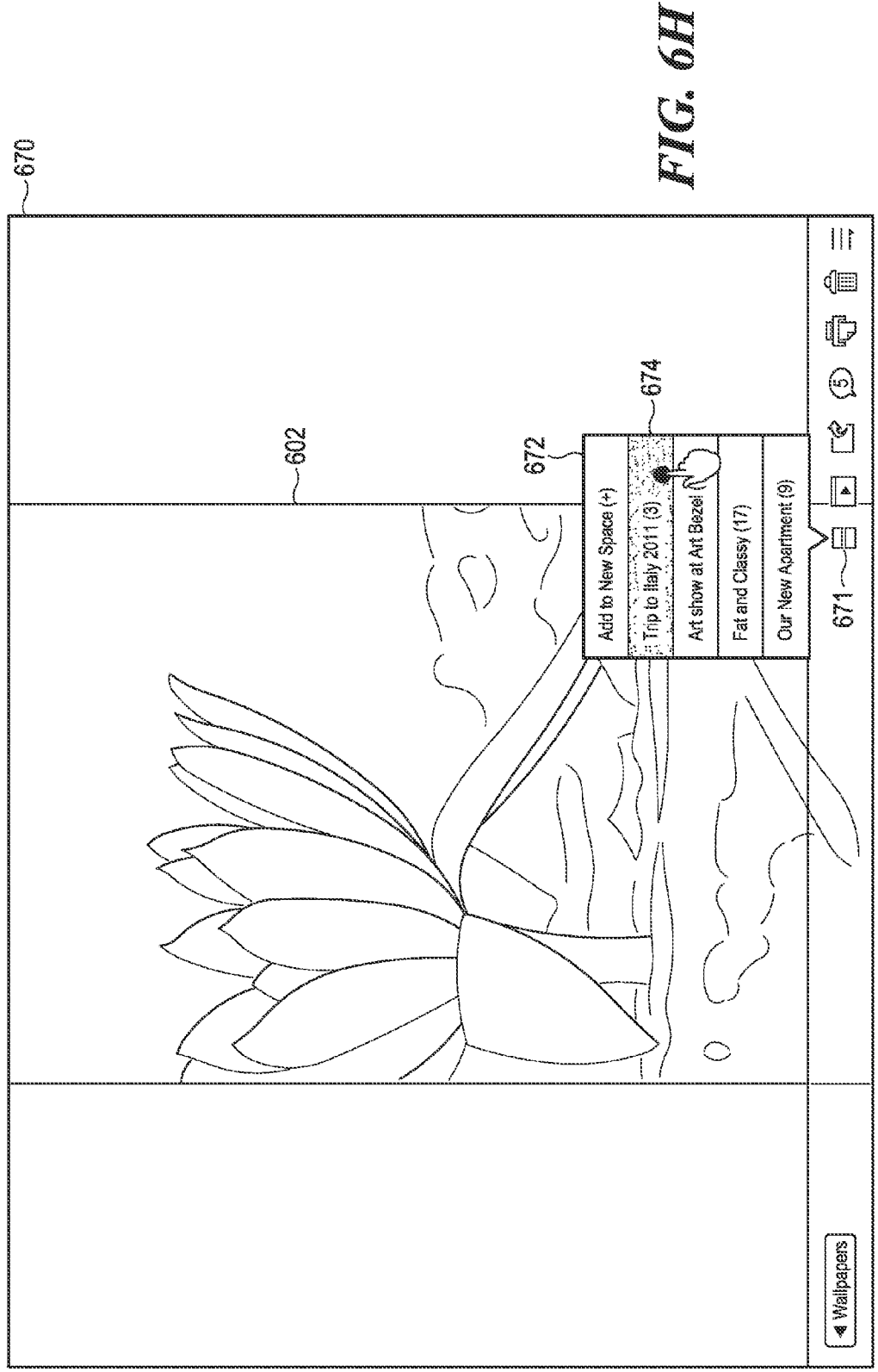

FIG. 7C

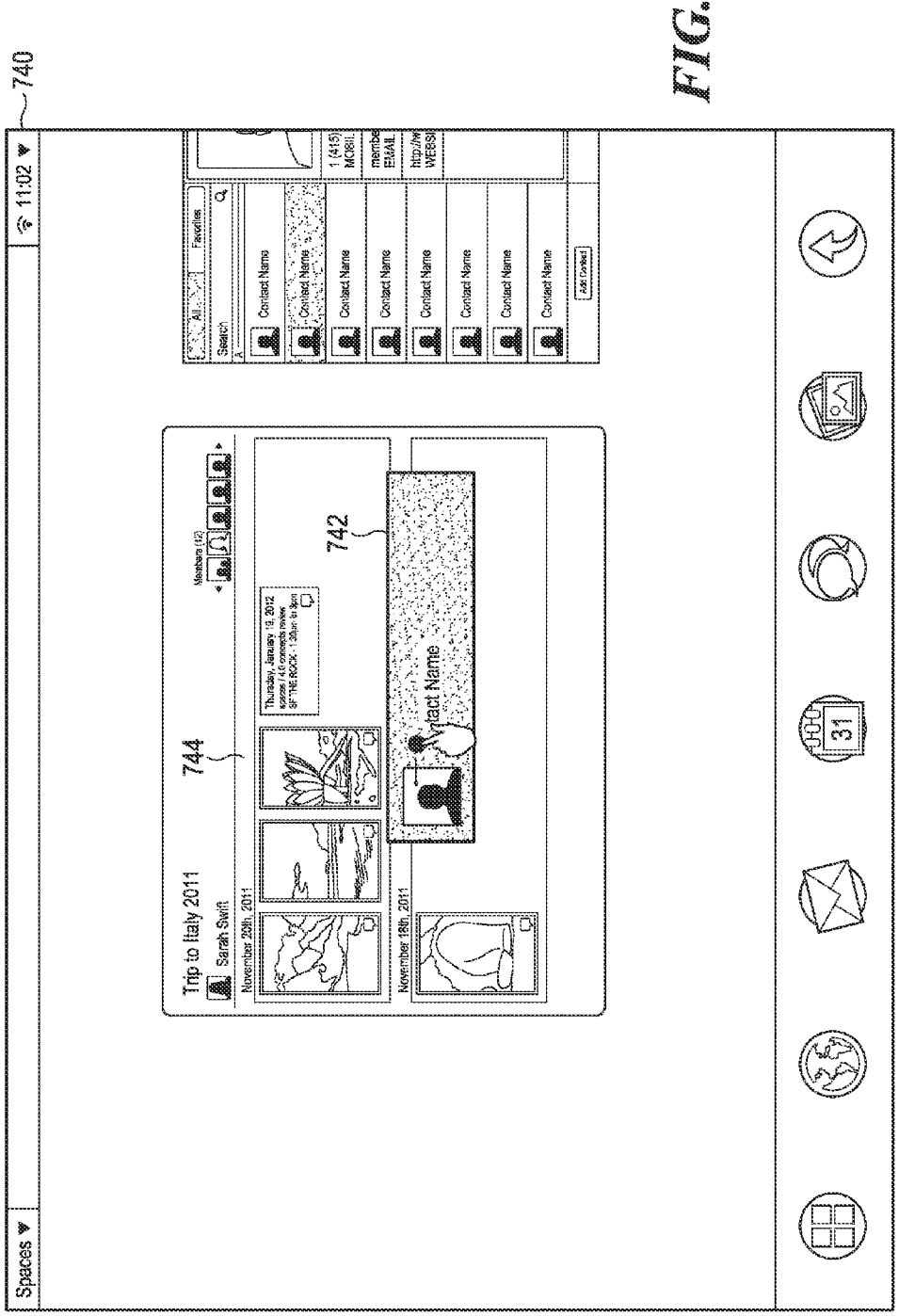

FIG. 7F

SHARING OF USER INTERFACE OBJECTS VIA A SHARED SPACE

PRIORITY CLAIM TO RELATED APPLICATIONS

This application is a national phase application under 35 U.S.C. § 371 of International Application No. PCT/US2012/044868, filed Jun. 29, 2012. The entire content of the above-referenced disclosure is incorporated herein by reference without disclaimer.

BACKGROUND

In the past decade, the Internet has grown at an exponential rate, digital multimedia capabilities have rapidly expanded, and users now have access to portable electronic devices with significant storage and processing power. In view of these developments, many people now rely heavily on electronic devices, such as personal computers, smartphones, and tablets. For example, many people utilize these devices to view pictures and videos, listen to music, write notes and emails, and run a number of other applications. Additionally, people now extensively use such devices for business and social communications and therefore commonly desire to share content from their devices with other people.

BRIEF DESCRIPTION OF THE DRAWINGS

The following detailed description references the drawings, wherein:

FIG. 6C is a diagram of an example interface in which a user has moved a photo from a photos application onto an icon representing a particular shared space;

FIG. 6F is a diagram of an example interface in which a user has moved a photo from a photos application onto an icon representing a new shared space;

FIG. 6H is a diagram of an example interface including a pop-up menu for enabling a user to add a photo to a selected shared space;

FIG. 7C is a diagram of an example interface in which a user has moved a contact from a contacts application onto an icon representing a particular shared space;

FIG. 7E is a diagram of an example interface in which a user has moved a contact from a contacts application to a shared space indicating a desire to add the contact as a user interface object;

FIG. 7F is a diagram of an example interface in which a user has moved a contact from a contacts application to a shared space indicating a desire to add the contact as a user granted access.

DETAILED DESCRIPTION

Figure 1:
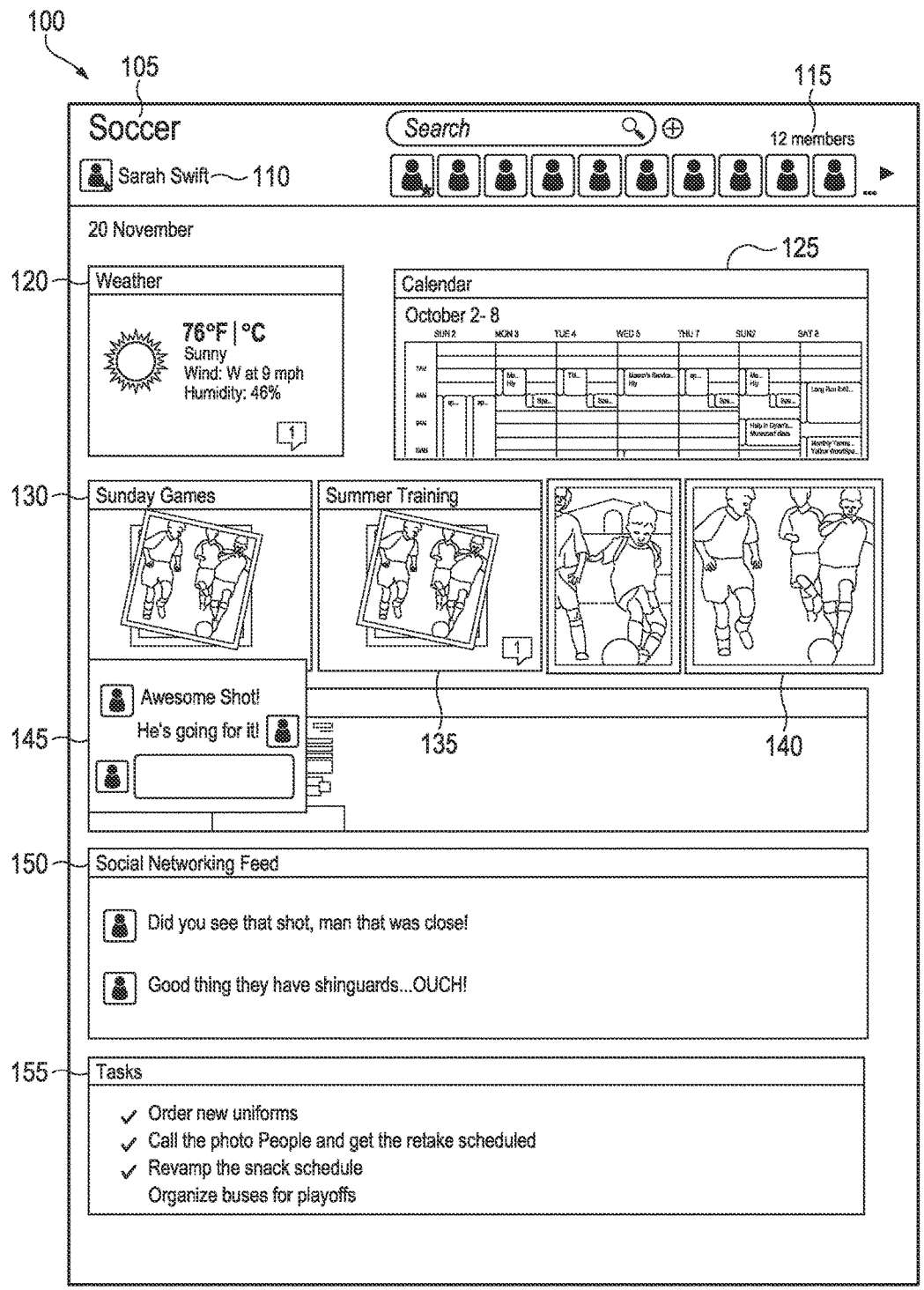
FIG. 1 is a diagram of an example interface of a shared space for sharing user interface objects with other users.

As detailed above, people now rely on electronic devices to accomplish a number of tasks, including communicating with one another electronically. To this end, users may desire to share pictures, video, or other electronic files with one another via the Internet or another network.

Some existing solutions enable a user to share files with other users via a social network, online file hosting service, or other web-based service. For example, in some solutions, a user may create an account with an online file sharing service and select users to be granted access to a shared folder. The file sharing service may then push any files uploaded to the folder to each user granted access and subsequently synchronize any file changes between the devices. In another solution, a user may access an application or website that provides an online pin board for sharing a collection of pictures with a group of users. By uploading pictures to a pin board, the user can thereby share pictures related to a particular topic with other users.

Existing solutions, however, generally do not allow the user to easily add a user interface (UI) object and its associated functionality to a predefined shared area and then share that area with other users. For example, existing solutions do not allow a user to share an editable UI object (e.g., a memo or to-do list) that is editable within the shared area itself. Similarly, existing solutions do not allow a user to share a UI object that connects to a remote data service to dynamically update its content, such as a weather widget, news feed, or travel booking application. Existing solutions also generally do not include user-friendly interaction models implemented by the operating system of the device to enable a user to quickly share any UI object from any application.

Example embodiments disclosed herein address these issues by providing a data sharing application for enabling a user to easily share user interface objects with other users. For example, in some embodiments, a computing device executes a data sharing application that provides a group of shared spaces, where each shared space maintains a group of UI objects that may be shared with other users. The computing device may then receive a user command to transfer a respective UI object from each of a plurality of applications to one of the shared spaces. In response, the computing device may then display each transferred UI object within the shared space, such that each displayed UI object retains associated functionality from the corresponding application within the shared space. Finally, the computing device may share each UI object in the shared space with a group of users granted access to the shared space by, for example, uploading each UI object to a server.

In this manner, example embodiments disclosed herein enable a user to easily share UI objects from various applications with other users, such that the functionality of the UI objects is transferred between the users. As a result, UI objects retain their functionality within the shared space, thereby enabling direct manipulation of the UI objects within the shared space. Furthermore, example embodiments provide user-friendly interaction models that enable a user to drag any UI object into a shared space, to manage sharing of the shared space using a contacts application, and to join shared spaces controlled by others using a notification system.

Referring now to the drawings, FIG. 1 is a diagram of an example interface 100 of a shared space 105 for sharing user interface objects with other users. The following description of FIG. 1 provides an overview of a shared space that has already been created, populated, and shared by a user of a computing device. Further implementation details regarding the processes for creating a space, adding UI objects to the space, sharing the space with other users, and receiving invitations to join spaces are provided below in connection with FIGS. 2 through 8.

As illustrated in FIG. 1, a user has created a shared space 105 entitled "Soccer." This shared space 105 may be a particular shared space of a group of spaces managed by a data sharing application executing on a computing device. As shown by user indicator 110, the shared space is managed by Sarah Swift and includes 12 members, as indicated by member list 115. Member list 115 includes an avatar for each user, which may be a photograph or other depiction of the person. The owner of the space, Sarah, is identified in member list 115 with a star overlaid on her avatar.

Using the processes described in further detail below, Sarah or other members of the space have added a number of UI objects from other applications running on their computing devices to shared space 105. In particular, shared space 105 includes a weather UI object 120 transferred from a weather application to display the current weather conditions at a given location. Calendar UI object 125, transferred from an email or calendar application, displays a calendar for a given week, while enabling users of shared space 105 to update the calendar from within shared space 105.

Shared space 105 also includes several photos 130, 135, 140. Comment UI object 145 enables users in member list 115 to add comments with respect to photo 130. Social networking feed 150 is a UI object that retrieves posts from a social networking web service. Finally, task UI object 155 is an editable to-do list that enables users of shared space 105 to add tasks and mark the tasks as completed from within shared space 105. Task UI object 155 may, for example, have been dragged from a separate application that enables a user to manage lists of tasks.

Figure 2:
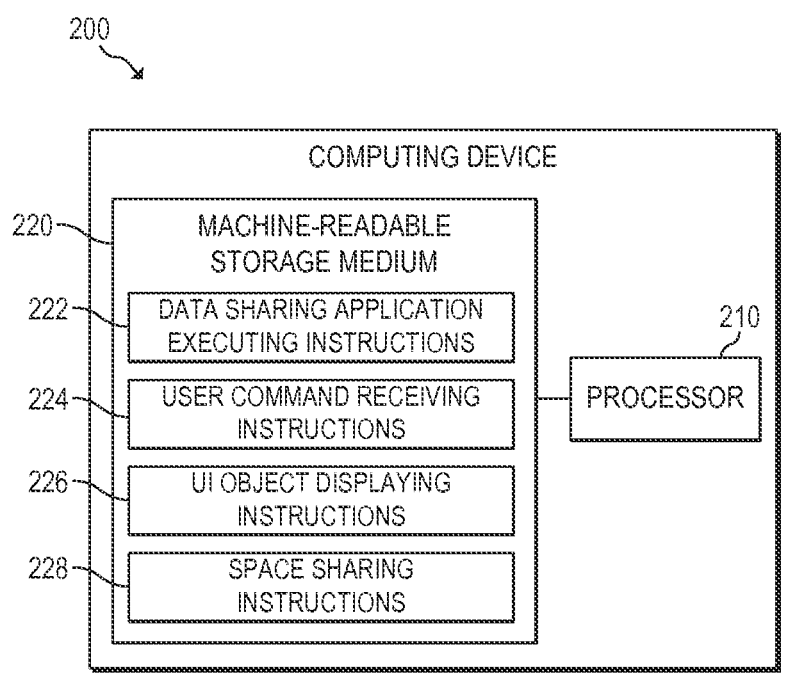
FIG. 2 is a block diagram of an example computing device for sharing user interface objects and any associated functionality via a shared space.

FIG. 2 is a block diagram of an example computing device for sharing user interface objects and any associated functionality via a shared space. Computing device 200 may be, for example, a notebook computer, a desktop computer, an all-in-one system, a tablet, a mobile phone, a set-top box, or any other computing device suitable for displaying a user interface and receiving user input via the user interface. In the embodiment of FIG. 2, computing device 200 includes a processor 210 and a machine-readable storage medium 220.

Processor 210 may be one or more central processing units (CPUs), semiconductor-based microprocessors, and/or other hardware devices suitable for retrieval and execution of instructions stored in machine-readable storage medium 220. Processor 210 may fetch, decode, and execute instructions 222, 224, 226, 228 to create, manage, and share a space of UI objects. As an alternative or in addition to retrieving and executing instructions, processor 210 may include one or more electronic circuits that include electronic components for performing the functionality of one or more of instructions 222, 224, 226, 228.

Machine-readable storage medium 220 may be any electronic, magnetic, optical, or other physical storage device that contains or stores executable instructions. In some implementations, storage medium 220 may be a non-transitory storage medium, where the term "non-transitory" does not encompass transitory propagating signals. Thus, machine-readable storage medium 220 may be, for example, Random Access Memory (RAM), an Electrically Erasable Programmable Read-Only Memory (EEPROM), a storage device, an optical disc, and the like. As described in detail below, machine-readable storage medium 220 may be encoded with a series of executable instructions 222, 224, 226, 228 for creating, managing, and sharing a space of UI objects.

Data sharing application executing instructions 222 may execute a data sharing application that provides a plurality of shared spaces and enables the user to navigate between these spaces. Each of the shared spaces may enable a user of computing device 200 to share UI objects with other users. For example, each space within the data sharing application may be one or more windows, frames, panels, and/or other user interface areas for displaying an arrangement of the UI objects maintained in connection with that space. A user may initially create a space using the data sharing application. For example, the user may launch the data sharing application, select a user interface object for triggering the creation of a new space, and assign a name to the space.

User command receiving instructions 224 may then receive and process user commands to transfer UI objects to the shared space from each of a plurality of applications executing on computing device 200. For example, computing device 200 may concurrently execute multiple applications and the user may trigger a transfer of a UI object from one of these applications to a particular shared space by providing input via a touch display, mouse, keyboard, or other input mechanism.

Each of the applications in computing device 200 may comprise instructions executable by processor 210 to enable a user to perform a set of specific tasks. The applications may reside within an operating system (OS) of computing device 200 and call functions provided by the OS to enable the user to perform these tasks. For example, each application may enable the user to communicate with other users, generate or view documents or other files, and/or access data via the Internet or another network. Thus, non-limiting examples of applications for execution in computing device 200 include an email application, messaging application, phone or videoconferencing application, web browser, word processor, contacts application, multimedia viewer, online application catalog, and the like.

In order to enable the user to provide input and receive output via computing device 200, each application may display a number of UI objects with which the user may interact. Each UI object may include a set of visual components outputted on an available display to provide information to a user. For example, the visual components for a given UI object may include visible text, images, UI widgets (e.g., text boxes, scroll bars, selection menus, etc.), or a combination thereof.

Furthermore, some UI objects may include a corresponding set of functions enabled by one or more portions of executable code. Some UI objects may include code that dynamically updates the content of the UI object by accessing a remote data source. To give a few specific examples, the UI object may be a weather widget that accesses a data source to update the weather or a travel booking widget that receives user input and searches one or more web-based travel services based on the input. Other UI objects may include code that enables the user to modify content of the UI object. To give a few examples, the UI object may be an image with associated code for cropping the image, a memo or email object with code for editing the text of the object, or a to-do list with code for adding items and marking them as completed. Other suitable examples of UI objects and their corresponding functions will be apparent depending on the particular type of application.

As mentioned above, the user may initialize the transfer of a UI object from a given application to a particular shared space by providing a predetermined command via touch, mouse, voice, or keyed input. As one specific example, the user may utilize a drag and drop operation by clicking or touching the UI object in the window of the application, continuing to hold the input while moving a mouse or finger, and releasing the object on a target associated with the shared space. The target may be, for example, the window of the shared space or an icon representing the shared space. As detailed below, instructions 126 may then manage the process for displaying the UI object in the shared space and enabling the associated functionality.

To enable the transfer of the UI object from the source application to the data sharing application, the source application may create a data object that stores data related to the UI object and then provide this data object to the data sharing application via the operating system of computing device 200. For example, the data object may be any data construct that stores metadata describing the UI object and a reference to code that executes functionality of the UI object. The metadata included in the data object may be any set of data that describes the particular UI object, which may include a unique identifier, a data type that specifies the type of UI object (e.g., email, image, video, contact, text message, note, etc.), and the actual content of the object, such as displayable text, images, UI widgets, or a combination thereof. The code referenced by the data object may include a predetermined set of functions that enable the functionality of the UI object and may be a reference to a file path that maintains the code or a copy of the code itself. As one specific example, the referenced code may be a set of JavaScript functions.

Upon receiving the data object for each UI object from the corresponding source application, UI object displaying instructions 226 may then display each transferred UI object within the shared space. When the UI object includes associated functionality, UI object displaying instructions 226 may display the object such that it retains the functionality from the corresponding application within the shared space. For example, upon receipt of the data object for a particular UI object, UI object displaying instructions 226 may access the metadata received with the data object and display the UI object based on the type of object as identified in the metadata. After displaying the UI object within the shared space, UI object displaying instructions 226 may then execute any code referenced in the data object to enable the functionality of the UI object within the shared space. In this manner, if the UI object dynamically updates its content within the source application by accessing a remote data source, the UI object may continue to dynamically update within the shared space. Similarly, if the UI object is editable within the source application, the UI object may continue to be editable within the shared space itself without loading the source application.

Space sharing instructions 228 may then share the space with a plurality of other users granted access to the shared space by the user, such that each UI object and the associated functionality is transferred to all of the users granted access. For example, the data sharing application may identify all UI objects in the space, obtain the corresponding data objects, and then transmit the data objects to a remote server that manages the shared spaces via the operating system of computing device 200. The remote server may subsequently identify the users who are granted access to the space and push the data object for each UI object in the space to each user with access to the space.

Figure 3:
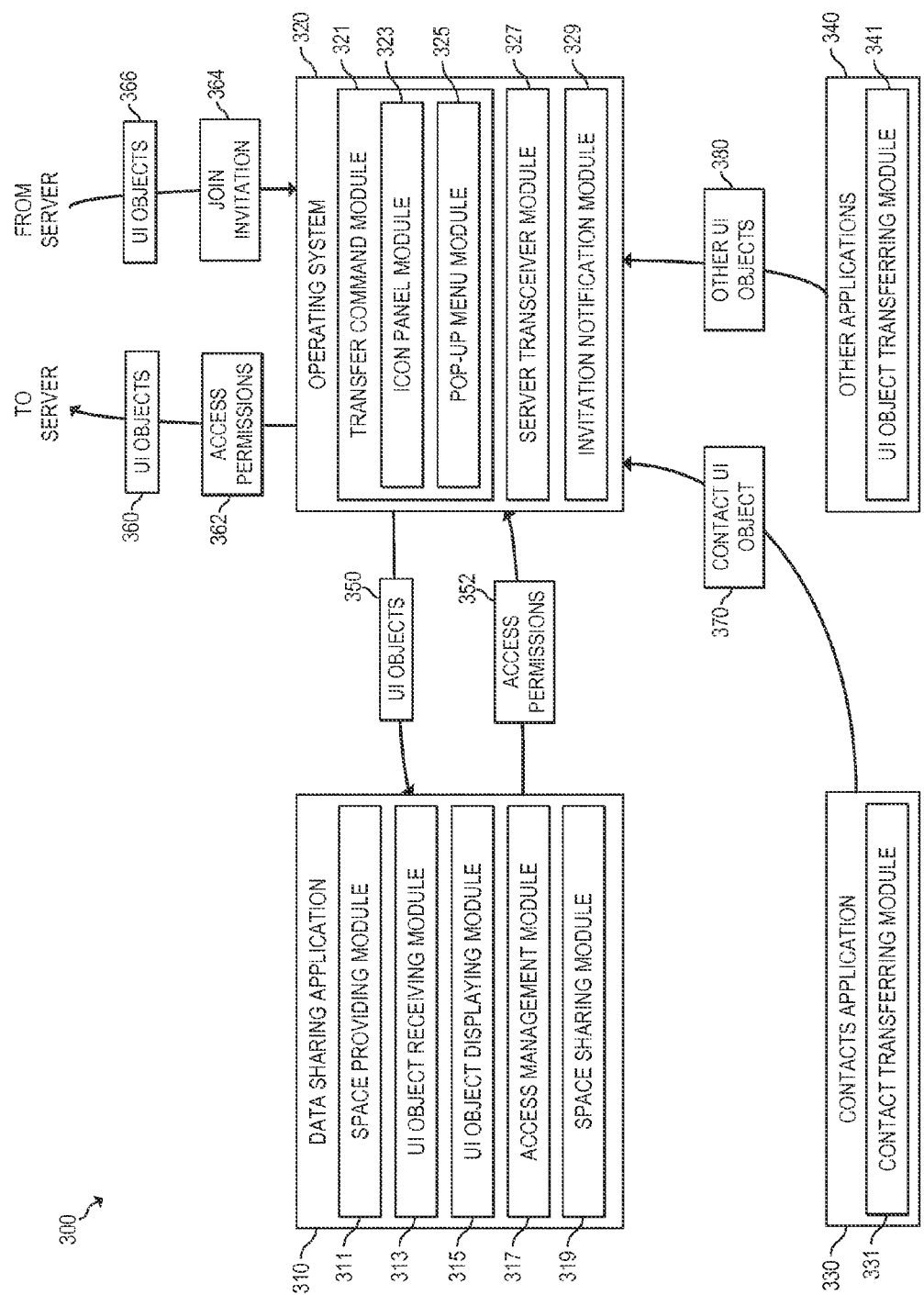
FIG. 3 is a block diagram of an example computing device for sharing user interface objects via a data sharing application, an operating system, a contacts application, and other applications.

FIG. 3 is a block diagram of an example computing device 300 for sharing user interface objects via a data sharing application 310, an operating system 320, a contacts application 330, and other applications 340. As with computing device 200 of FIG. 2, computing device 300 may be any computing device suitable for displaying a user interface and receiving user input via the user interface.

As illustrated in FIG. 3 and described in detail below, computing device 300 may include a number of modules 310-341. Each of the modules may include a series of instructions encoded on a machine-readable storage medium and executable by a processor of computing device 300. In addition or as an alternative, each module may include one or more hardware devices including electronic circuitry for implementing the functionality described below.

Data sharing application 310 may be any set of instructions executable by a processor of computing device 300 to enable a user to access a group of shared spaces. Thus, space providing module 311 of data sharing application 310 may output a user interface allowing a user to navigate between the shared spaces. Each of the shared spaces may be one or more windows, frames, panels, and/or other user interface areas for displaying an arrangement of UI objects maintained in connection with that space.

UI object receiving module 313 may initially receive data related to a group of UI objects 350 from operating system 320. As one example, UI object receiving module 313 may receive a data object for a contact UI object transmitted from a contacts application 330 or a data object for a UI object transmitted by another application 340 executing in computing device 300. UI object receiving module 313 may also receive data objects related to the UI objects maintained in a space shared by another user. For example, after a user has expressed a desire to join another user's shared space, operating system 320 may receive the data for the UI objects 366 from the server and then forward the corresponding UI objects 350 to UI object receiving module 313.

After receiving UI objects 350 from operating system 320, UI object displaying module 315 may then output the corresponding UI objects within an area of the shared space. For example, UI object displaying module 315 may determine the type of the UI object as specified in the received data object and output the content of the UI object based on the determined type. UI object displaying module 315 may also execute any code referenced in the data object to enable functionality of the UI object within the shared space. Thus, the UI objects 350 will retain their functionality within the shared space regardless of whether they were received from another application in device 300 or from another device via the server.

Access management module 317 may manage the process for receiving selections of users to be granted access to the shared space by the user. For example, the user may interact with the shared space or another user interface on device 300 to select a group of users who will be invited to join the shared space. In some implementations, the user may interact with contacts application 330 to select contacts to be granted access to the shared space. For example, as detailed below, the user may select a contact within the contacts application 330 and add the contact as a member of the shared space via icon panel module 323 or pop-up menu module 325, such that the details of the contact are forwarded to access management module 317 as contact UI object 370.

After receiving a selection of users to be granted access to the space, access management module 317 may then send access permissions 352 to operating system 320, where the access permissions 352 contain a listing of users to be granted access to the space. The operating system 320 may in turn forward access permissions 362 to the server that manages the shared space using server transceiver module 327. In response, the server may forward join invitations 364 to the devices of the other users granted access to the shared space and, in response, the devices of the other users may utilize invitation notification module 329 to allow the other users to join the shared space.

Space sharing module 319 may manage the process for sharing the UI objects in the shared space with other users. For example, space sharing module 319 may instruct server transceiver module 327 to transmit the data objects corresponding to any UI objects 360 in the shared space to the server that manages the shared space. In response, the server may forward the data objects for the UI objects 366 to the devices of the other users who have joined the shared space. In some implementations, space sharing module 319 may automatically trigger synchronization of the space whenever an object is added to the space or modified within the space. Alternatively, space sharing module 319 may only trigger synchronization of the space when a user activates a button or other UI element for uploading the UI objects.

Operating system 320 may be any set of instructions executable by a processor of computing device 300 to manage the hardware resources of computing device 300 and provide an interface to the hardware to applications running in OS 320. For example, as illustrated, operating system 320 may serve as an intermediary for the transfer of UI objects between data sharing application 310, contact application 330, and other applications 340.

Transfer command module 321 may manage the process for receiving UI objects 370, 380 from contacts application 330 and other applications 340 and then forwarding the UI objects 350 to data sharing application 310. Transfer command module 321 may initially monitor for input from the user indicating a desire to cause a transfer of a UI object to data sharing application 310. For example, transfer command module 321 may detect an input command in which the user has selected and held a particular UI object for a predetermined amount of time (e.g., one second), thereby indicating a desire to transfer the UI object to a shared space in data sharing application 310. Alternatively, transfer command module 321 may detect an input command in which the user has selected an icon or other UI element that triggers the display of a menu for transferring a UI object. For example, transfer command module 321 may trigger either icon panel module 323 or pop-up menu module 325.

Icon panel module 323 may be configured to display a panel of icons, where each icon in the panel corresponds to one of the shared spaces provided by data sharing application 310. The panel may be any frame, window, box, or other UI element that contains icons for the shared spaces, where each icon is a visual, textual, and/or symbolic representation of the space. For example, each icon may include a textual label of the name of the space and/or a thumbnail image representing the current contents of the space. In some implementations, the panel may animate into view by, for example, gradually extending into the visible area from the top, bottom, or side of the displayed user interface. The panel may then remain visible until the user provides a command to close the panel or, alternatively, drags the selected UI object from the window of the corresponding application 330, 340 onto the icon for a particular space.

Note that the displayed icon panel may be used for transfers of both contact UI objects 370 from a contacts application 330 and other UI objects 380 from another application 380. For example, when a contact is selected and held within contacts application 330, the icon panel may slide into view. The user may then add a particular contact to the space as a member to be granted access or as a UI object by dragging the contact onto the icon of a corresponding space. Icon panel module 323 may similarly trigger display of the icon panel when a UI object is selected and held within another application 340. Example implementations of an icon panel 612 are described below in connection with FIGS. 6B-6D, 6F, and 6G.

As an alternative to a panel of icons, pop-up menu module 325 may instead display a pop-up menu that lists an identifier for each of the shared spaces provided by data sharing application 310. For example, the pop-up menu may be overlaid on the existing user interface and may contain a textual label of the name for each space. As with icon panel module 323, the displayed pop-up menu is applicable to both contacts application 330 and other applications 340. Thus, module 323 may display the pop-up menu within contacts application 330 and, in response to a selection of a particular space in the pop-up menu, transfer the currently-selected contact to data sharing application 310 via operating system 320 as contact UI object 370. Similarly, module 323 may display the pop-up menu within another application 340 and, in response to a selection of a particular space in the pop-up menu, transfer the currently-selected object to data sharing application 310 as other UI object 380. Example implementations of a pop-up menu are described below in connection with FIGS. 6H, 6I, and 7A-7C.

Note that, in some implementations, rather than displaying a panel of icons or a pop-up menu, transfer command module 321 may facilitate the transfer of UI objects via a simple drag and drop command from the window of an application to an opened space. For example, upon receipt of a held selection of a particular UI object, transfer command module 321 may modify the current view such that the window of the opened space becomes visible. The user may then transfer the selected UI object to the opened space by dragging the UI object and releasing the UI object within the window of the space. An example of this process as applied to a contact UI object 370 is described below in connection with FIGS. 7E and 7F.

Upon receipt of an instruction to transfer a UI object via the icon panel, pop-up menu, or a drag and drop command, transfer command module 321 may then manage the transfer of the data for the UI object 350 to data sharing application 310. For example, transfer command module 321 may receive the data object for the UI object 370, 380 from either contacts application 330 or another application 340. As detailed above, this data object may include metadata and code for the UI object. Transfer command module 321 may then provide the data object for the UI object 350 to data sharing application 310 for processing by UI object receiving module 313, UI object displaying module 315, and/or access management module 317.

Server transceiver module 327 may manage the process for exchanging data with one or more servers that manage the shared spaces. For example, server transceiver module 327 may receive a command from data sharing application 310 to synchronize a particular shared space to the server. In response, server transceiver module 327 may transmit the data objects for the UI objects 360 included in the shared space and any access permissions 362 for the shared space to a server at a predetermined location. In transmitting the data objects for the UI objects, server transceiver module 327 may include the metadata and a copy of any code associated with the UI object. Server transceiver module 327 may also send the UI objects 360 to the server when the objects are modified within the shared space, such that the changes remain synchronized between devices and users.

Server transceiver module 327 may similarly manage the process for receiving data from the server related to shared spaces provided by other users or devices. For example, when another user invites the user of device 300 to join a shared space, server transceiver module 327 may receive a join invitation 364 from the server and provide the invitation to notification module 329. When the user indicates a desire to join the shared space, server transceiver module 327 may notify the server accordingly and, in response, receive the data object for each of the UI objects 366 included in the shared space. Server transceiver module 327 may then provide the data objects to data sharing application 310 to be added to the shared space. Server transceiver module 327 may similarly manage the process for receiving UI objects 366 from the server when another user has modified or added an object within a space managed by the user of computing device 300.

Invitation notification module 329 may manage the process for enabling a user of computing device 300 to join a shared space based on an invitation from another user. For example, upon receipt of a join invitation 364 received from a server via server transceiver module 327, notification module 329 may initially display a pop-up notification that indicates to the user of computing device 300 that another user has granted the user access to a shared space. The pop-up notification may be overlaid on the current user interface and may contain details regarding the shared space, such as the name of the space and an identifier of the other user. An example implementation of the notification is described below in connection with FIG. 8.

In response to selecting the pop-up notification, the user may then navigate to a menu providing an option to join the shared space. Alternatively, the pop-up notification may include a UI element (e.g., a button) for joining the shared space, such that the user may join the shared space directly from the notification. Regardless of the implementation, upon receiving a command to obtain access to the shared space, invitation notification module 329 may notify server transceiver module 327, which may then trigger the synchronization of the UI objects 360 contained in the shared space from the server. As detailed above, server transceiver module 327 may then provide the received UI objects to data sharing application 310 to be added to a new space.

Contacts application 330 may be any set of instructions executable by a processor of computing device 300 to enable a user to manage contact information for other users. For example, contacts application 330 may provide a user interface by which the user may navigate between contacts to view their contact details, including phone numbers, email addresses, and other user identifiers.

Contact transferring module 331 may manage the process for transferring contact UI objects 370 from contacts application 330 to data sharing application 310 via operating system 320. As mentioned above, the user may trigger a transfer of a contact UI object 370 to a particular shared space via an icon panel, pop-up menu, or a drag and drop command. In response to a command to transfer a UI object 370, contact transferring module 331 may create a data object that stores metadata related to the selected contact, including the contact's name, email address, phone number, and/or user identifier. Contact transferring module 331 may then transfer the data object for the UI object 370 to operating system 320, which may in turn forward the contact to data sharing application 310 so that the contact can be added to the space as a UI object or as a user to be granted access.

Each of the other applications 340 may be any set of instructions executable by a processor of computing device 300 to enable a user to perform a set of specific tasks. As with contact transferring module 331, UI object transferring module 341 may manage the process for transferring other UI objects 380 from other applications 340 to data sharing application 310 via operating system 320. As mentioned above, the user may trigger a transfer of a UI object 380 to a particular shared space via an icon panel, pop-up menu, or a drag and drop command. In response to a command to transfer a UI object 380, UI object transferring module 341 may then create a data object that stores metadata related to the selected object and, in some scenarios, a reference to code for implementing functionality related to the object. UI object transferring module 341 may then transfer the data object 380 to operating system 320, which may in turn forward the object to data sharing application 310 so that the object can be added to the space.

Figure 4:
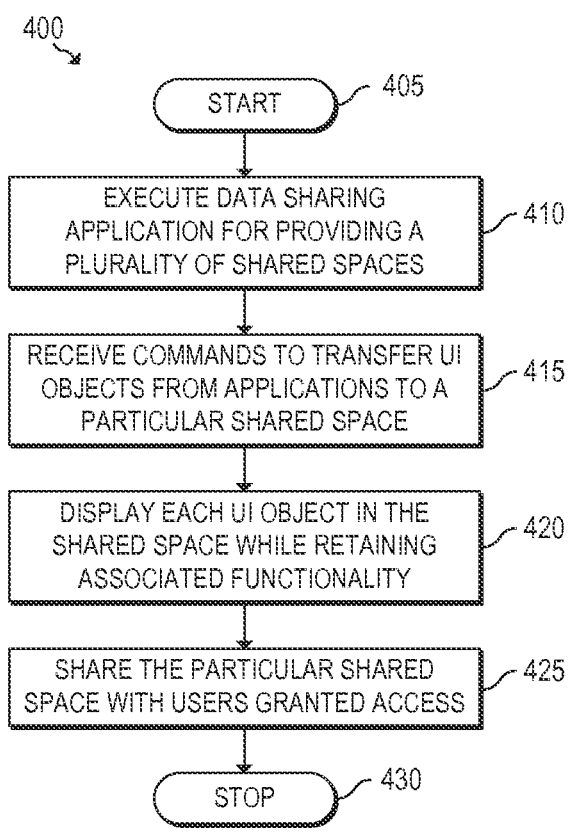
FIG. 4 is a flowchart of an example method for sharing user interface objects and any associated functionality via a shared space.

FIG. 4 is a flowchart of an example method 400 for sharing user interface objects and any associated functionality via a shared space. Although execution of method 400 is described below with reference to computing device 200 of FIG. 1, other suitable devices for execution of method 400 will be apparent to those of skill in the art (e.g., computing device 300). Method 400 may be implemented in the form of executable instructions stored on a machine-readable storage medium, such as storage medium 220, and/or in the form of electronic circuitry.

Method 400 may start in block 405 and continue to block 410, where computing device 200 may execute a data sharing application for providing a plurality of shared spaces. For example, each shared space may be a discrete user interface that displays an arrangement of UI objects stored in connection with the space.

Next, in block 415, computing device 200 may receive commands to transfer UI objects from applications running on computing device 200 to one of the shared spaces. As one example, to transfer a given UI object, the user may select the UI object within the window of a given application, hold the selection of the UI object while moving the UI object, and then release the UI object on a target associated with the shared space.

In block 420, computing device 200 may receive the transferred UI objects within the data sharing application and, in response, display each UI object in the shared space. As detailed above, computing device 200 may display the UI objects in the shared space in a manner that retains the functionality of the UI object within the shared space. For example, the data sharing application may output a UI object within the shared space and subsequently execute code associated with the object.

Finally, in block 425, computing device 200 may share the particular shared space with users granted access to the space by the user. For example, the data sharing application may identify each UI object within the space and transmit the data object corresponding to each UI object to a remote server. In response, the remote server may manage the process for synchronizing each UI object to each device belonging to each user granted access to the shared space. Method 400 may then proceed to block 430, where method 400 may stop.

Figure 5A:
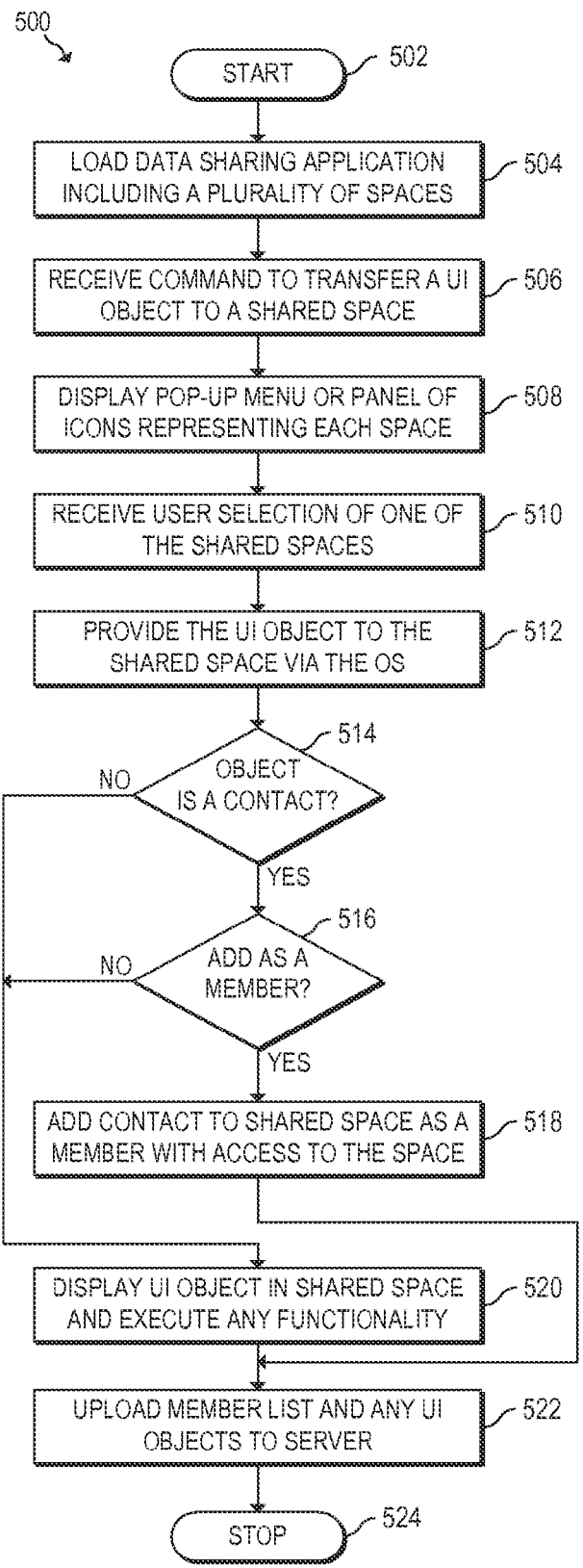
FIG. 5A is a flowchart of an example method for adding user interface objects to a shared space.

FIG. 5A is a flowchart of an example method 500 for adding user interface objects to a shared space. Although execution of method 500 is described below with reference to components of computing device 300 of FIG. 3, other suitable components for execution of method 500 will be apparent to those of skill in the art. Method 500 may be implemented in the form of executable instructions stored on a machine-readable storage medium and/or in the form of electronic circuitry.

Method 500 may start in block 502 and continue to block 504, where computing device 300 may load a data sharing application 310 including a plurality of shared spaces. In block 506, computing device 300 may then receive a user command to transfer a UI object. For example, the user may express a desire to transfer a UI object to a shared space by selecting and holding the UI object in an application 330, 340 for a predetermined period of time.

Next, in block 508, operating system 320 may display a pop-up menu or panel of icons, where each entry in the menu or panel corresponds to one of the spaces provided by data sharing application 310. In block 510, operating system 320 may receive a selection of one of the shared spaces from the menu or panel. For example, when operating system 320 has displayed a pop-up menu, the selection may be a touch, click, or other selection of one of the spaces listed in the menu. Alternatively, when operating system 320 has displayed a panel of icons, the selection may be a command by which the user drags the UI object from the window of the application onto the icon of one of the spaces within the panel of icons. In block 512, the corresponding application 330, 340 may then provide a data object for the UI object to the shared space via operating system 320.

Method 500 may then continue to block 514, where data sharing application 310 may determine whether the received UI object is a contact object provided by a contacts application 330. If the UI object is not a contact object, method 500 may skip directly to block 520, described in detail below. Otherwise, if the UI object is a contact object, method 500 may continue to block 516. In block 516, data sharing application 310 may determine whether the user desires to add the contact as a member to be granted access to the space or, alternatively, as a UI object. For example, data sharing application 310 may display a prompt that enables the user to specify whether the contact should be added as a member or as a UI object.

If the contact will not be added as a member (i.e., will be added as a UI object), method 500 may skip directly to block 520, described in detail below. Otherwise, method 500 may continue to block 518, where data sharing application 310 may add the particular contact to the list of members to be granted access to the shared space. After data sharing application 310 adds the contact as a member of the shared space, method 500 may continue to block 522, described in detail below.

When the object to be added is not a contact or a contact is to be added to the space as a UI object, the data sharing application 310 may then display the UI object in the shared space in block 520. For example, data sharing application 310 may identify the type of the UI object and output the UI object within the shared space in accordance with the type. Data sharing application 310 may also execute any functionality of the UI object received from the source application 330, 340 by loading and executing the code referenced in the data object.

After data sharing application 310 adds the contact as a member in block 518 or displays the UI object in block 520, method 500 may continue to block 522. In block 522, data sharing application 310 may trigger the upload of the UI objects 360 in the space and any access permissions 362 for the space. For example, data sharing application 310 may direct server transceiver module 327 to synchronize the space to a server at a predetermined location. Method 500 may then proceed to block 524, where method 500 may stop.

Figure 5B:
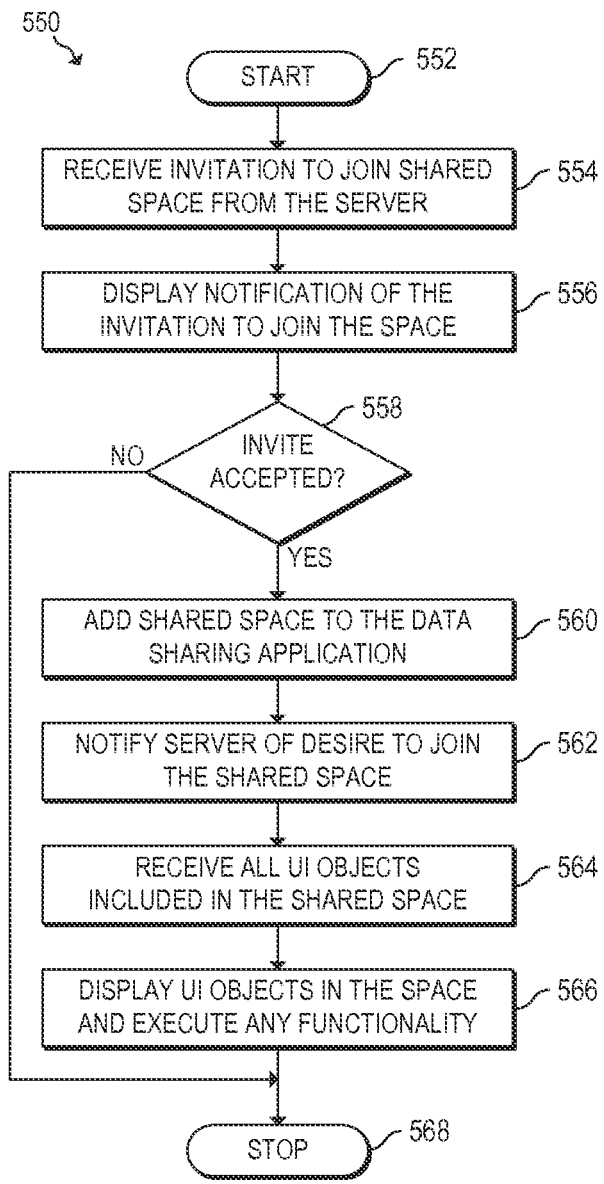
FIG. 5B is a flowchart of an example method for joining a shared space in response to an invitation provided from another user.

FIG. 5B is a flowchart of an example method 550 for joining a shared space in response to an invitation provided from another user. Although execution of method 550 is described below with reference to components of computing device 300 of FIG. 3, other suitable components for execution of method 550 will be apparent to those of skill in the art. Method 550 may be implemented in the form of executable instructions stored on a machine-readable storage medium and/or in the form of electronic circuitry.

Method 550 may start in block 552 and continue to block 554, where operating system 320 of computing device 300 may receive an invitation 364 to join a shared space from a server. The invitation may identify the details of a space controlled by another user, such as the name of the space and information identifying the other user. In block 556, operating system 320 may then display a notification of the invitation to join the space using, for example, a pop-up message overlaid on the currently-displayed user interface.

Next, in block 558, operating system 320 may determine whether the user of computing device 300 has accepted the invitation to join the shared space. If the user has not accepted the invitation, method 550 may skip directly to block 568, where method 550 may stop. Alternatively, when the user has accepted the invitation to join the shared space controlled by the other user, method 550 may continue to block 560.

In block 560, data sharing application 310 may receive details regarding the shared space and, in response, add the shared space as one of the shared spaces accessible within application 310. In addition, in block 562, operating system 320 may notify the server of the user's desire to join the shared space. In response, in block 564, server transceiver module 327 may receive data objects for the UI objects 366 included in the shared space from the server and forward the data objects to data sharing application 310.

Finally, in block 566, data sharing application 310 may receive the data object for each of the UI objects 350 and, in response, output each UI object within the shared space. For example, data sharing application 310 may determine the type of each UI object, display the UI object in accordance with the type, and then load and execute any code received with the object. Data sharing application 310 may thereby display the UI objects within the shared space such that they retain their functionality from the source applications on the other user's device. Method 500 may then stop in block 568.

Turning now to FIGS. 6A-I, 7A-7F, and 8, these figures illustrate example user interfaces for enabling the shared space functionality described herein. Each of the interfaces and corresponding interaction models may be implemented as a series of instructions executable by a processor of a computing device to trigger output of the interface on a display of the device. Note that, although the examples below are described with respect to simple UI objects (a photo and a contact), the described user interfaces are equally applicable to any UI objects. Thus, the described interactions may also be applied to UI objects that include embedded functionality.

Figure 6A:
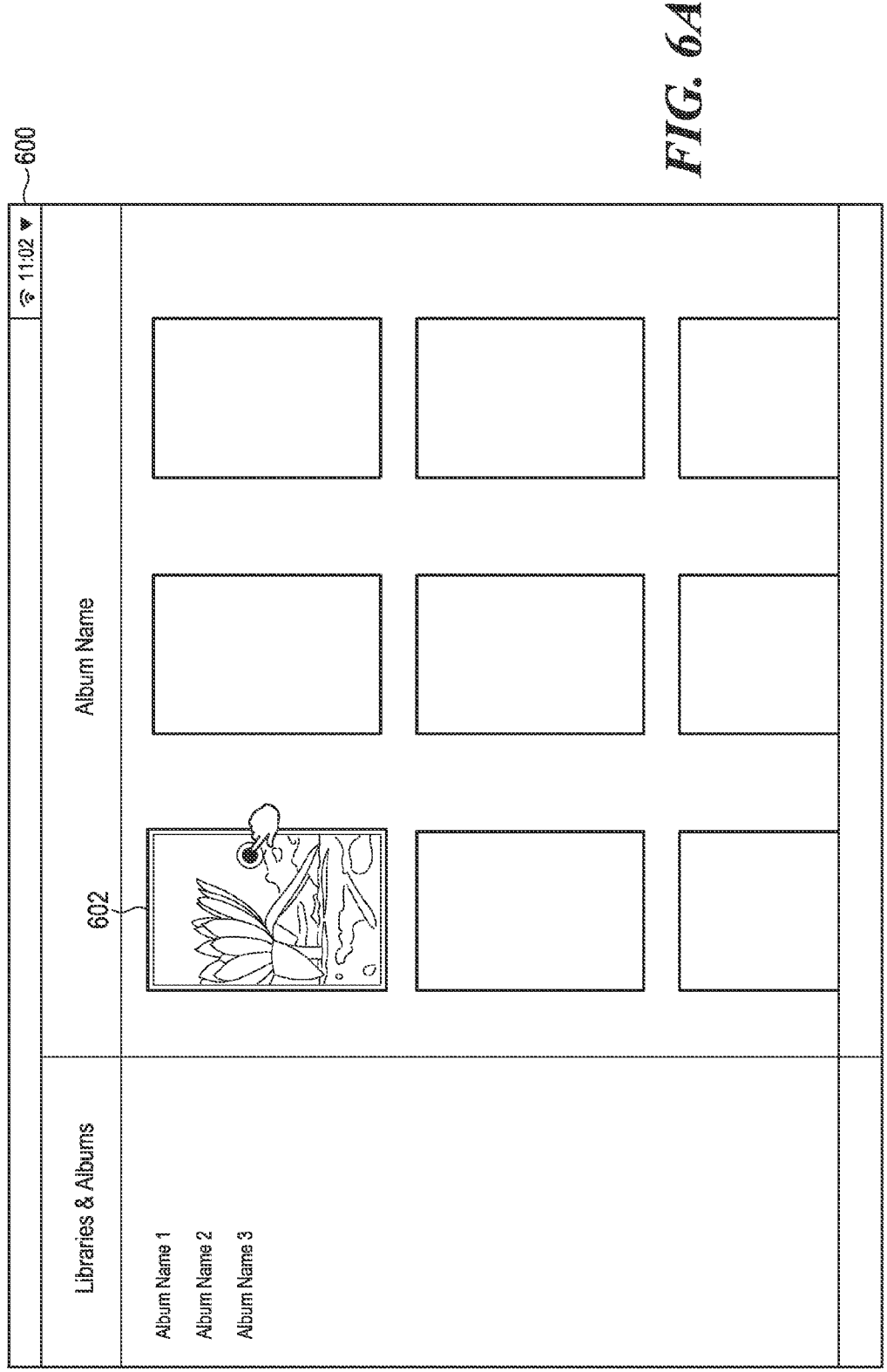
FIG. 6A is a diagram of an example interface of a photos application including an object to be added to a shared space.

FIG. 6A is a diagram of an example interface 600 of a photos application including an object to be added to a shared space. In this example, interface 600 includes a photos application that displays a group of photos, including photo 602. As illustrated, the user has utilized a touch command to select and hold photo 602 within interface 600.

Figure 6B:
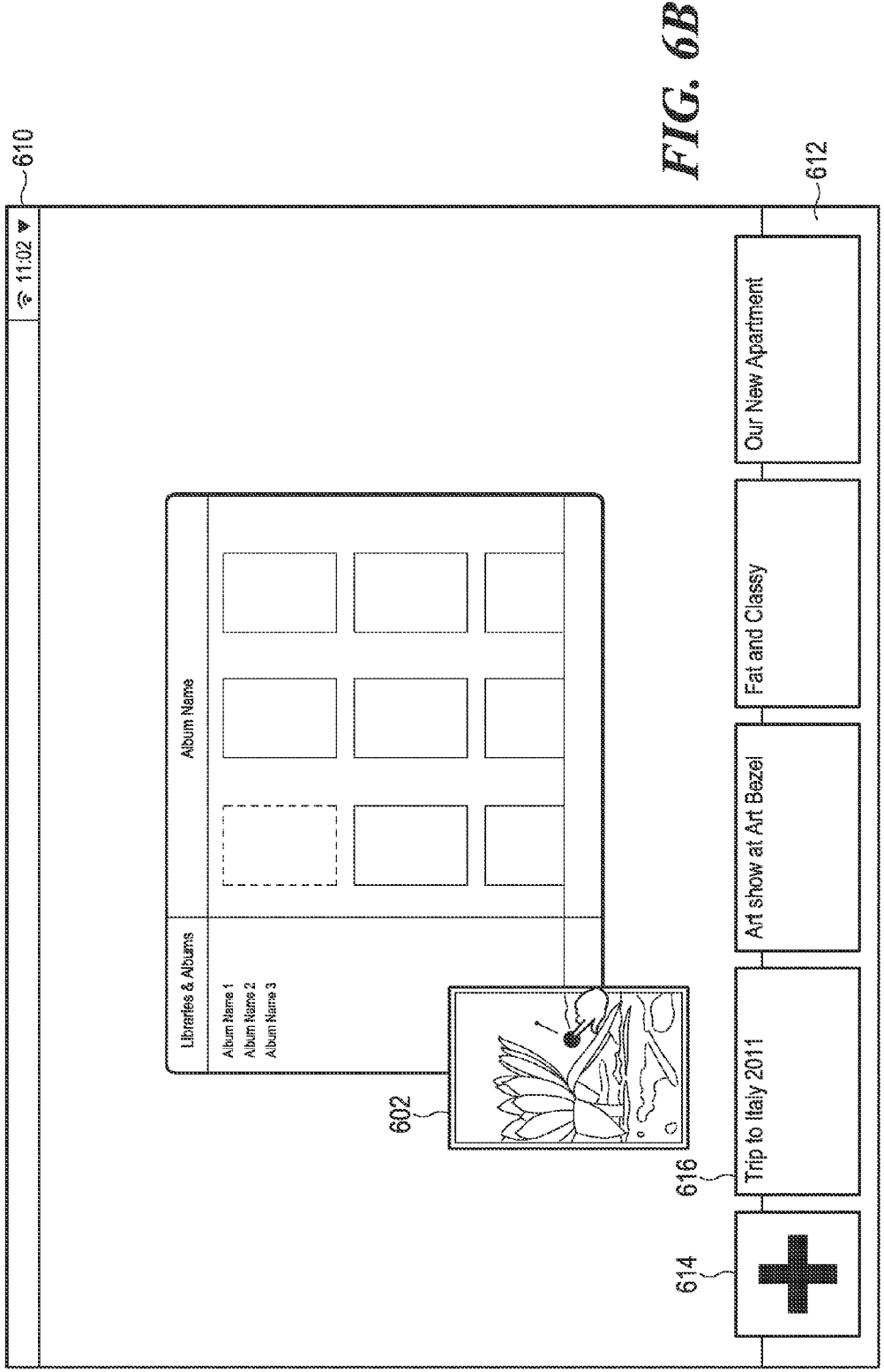
FIG. 6B is a diagram of an example interface in which a user has moved a photo from a photos application toward a panel of icons representing a plurality of shared spaces.

FIG. 6B is a diagram of an example interface 610 in which a user has moved a photo 602 from a photos application toward a panel of icons 612 representing a plurality of shared spaces. As illustrated, in response to the user activating a touch and holding the touch on photo 602, the device has modified the interface. In particular, the device has placed the photos application into a windowed mode and triggered display of a panel of icons 612. The panel of icons includes an icon 614 that may be used to create a new space, as detailed below in connection with FIGS. 6F & 6G. The panel of icons 612 also includes an icon for each of a number of existing spaces, including an icon 616 for the space entitled, "Trip to Italy 2011."

FIG. 6C is a diagram of an example interface 620 in which a user has moved a photo 602 from a photos application onto an icon 616 representing a particular shared space. As illustrated, the user has continued to hold the touch command and has dragged the photo 602 onto icon 616 in panel 612. As a result, the device has modified icon 616 to a different state (a grayscale background in this example), thereby providing feedback to the user that the "Trip to Italy 2011" space is the currently-selected target.

Figure 6D:
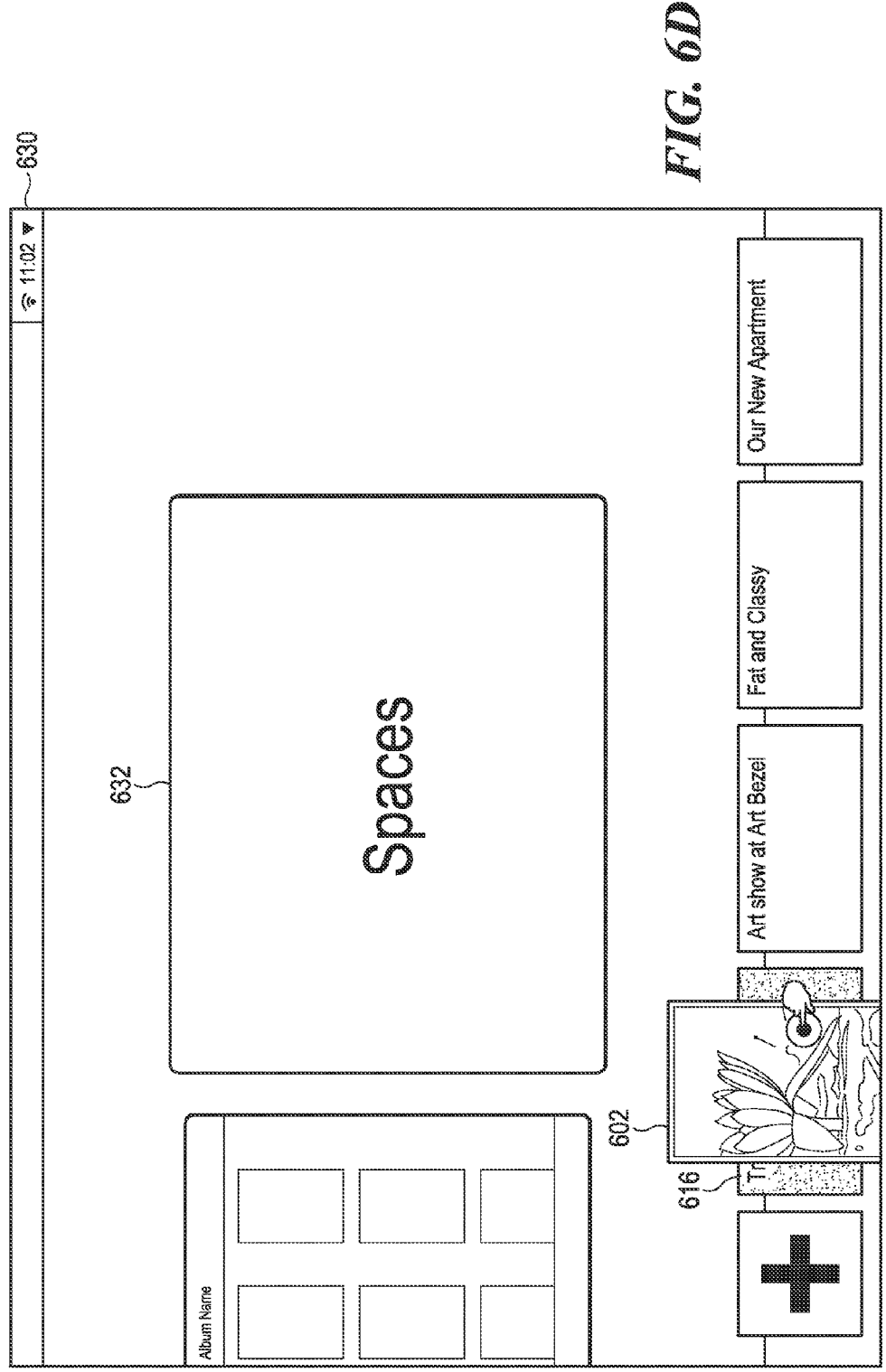
FIG. 6D is a diagram of an example interface in which an operating system has triggered display of a window corresponding to a particular shared space.

FIG. 6D is a diagram of an example interface 630 in which an operating system has triggered display of a window 632 corresponding to a particular shared space. In particular, in response to the user holding photo 602 over icon 616 for a predetermined period of time, the operating system has launched the data sharing application and displayed the "Trip to Italy 2011" space in a new window 632.

Figure 6E:
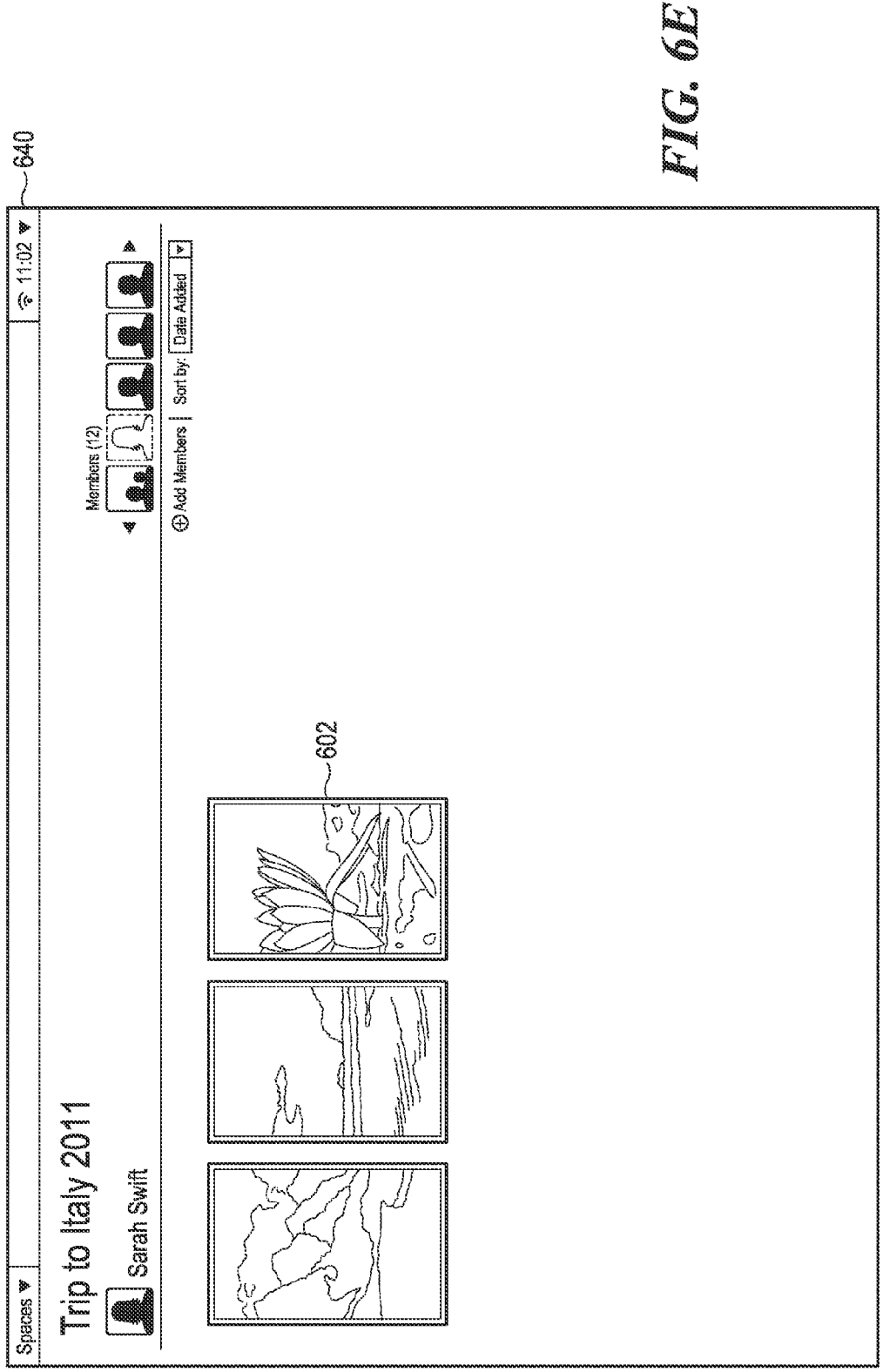
FIG. 6E is a diagram of an example interface in which a photo from a photos application has been added to a particular shared space.

FIG. 6E is a diagram of an example interface 640 in which a photo 602 from a photos application has been added to a particular shared space. More specifically, in response to the user releasing the held touch while photo 602 is overlaid on icon 616, the device has added photo 602 to the "Trip to Italy 2011" space. The device has also maximized the "Trip to Italy 2011" space to a full screen view in which all UI objects in the space (a total of 3 photos) are displayed.

FIG. 6F is a diagram of an example interface 650 in which a user has moved a photo 602 from a photos application onto an icon 614 representing a new shared space. As an alternative to adding photo 602 to an existing space, the device may instead add the photo 602 to a new space using the panel of icons 612. More specifically, as depicted in FIG. 6B but obscured in FIG. 6F, the panel of icons 612 may also include an icon 614 with a "+" symbol that represents the creation of a new space.

Figure 6G:
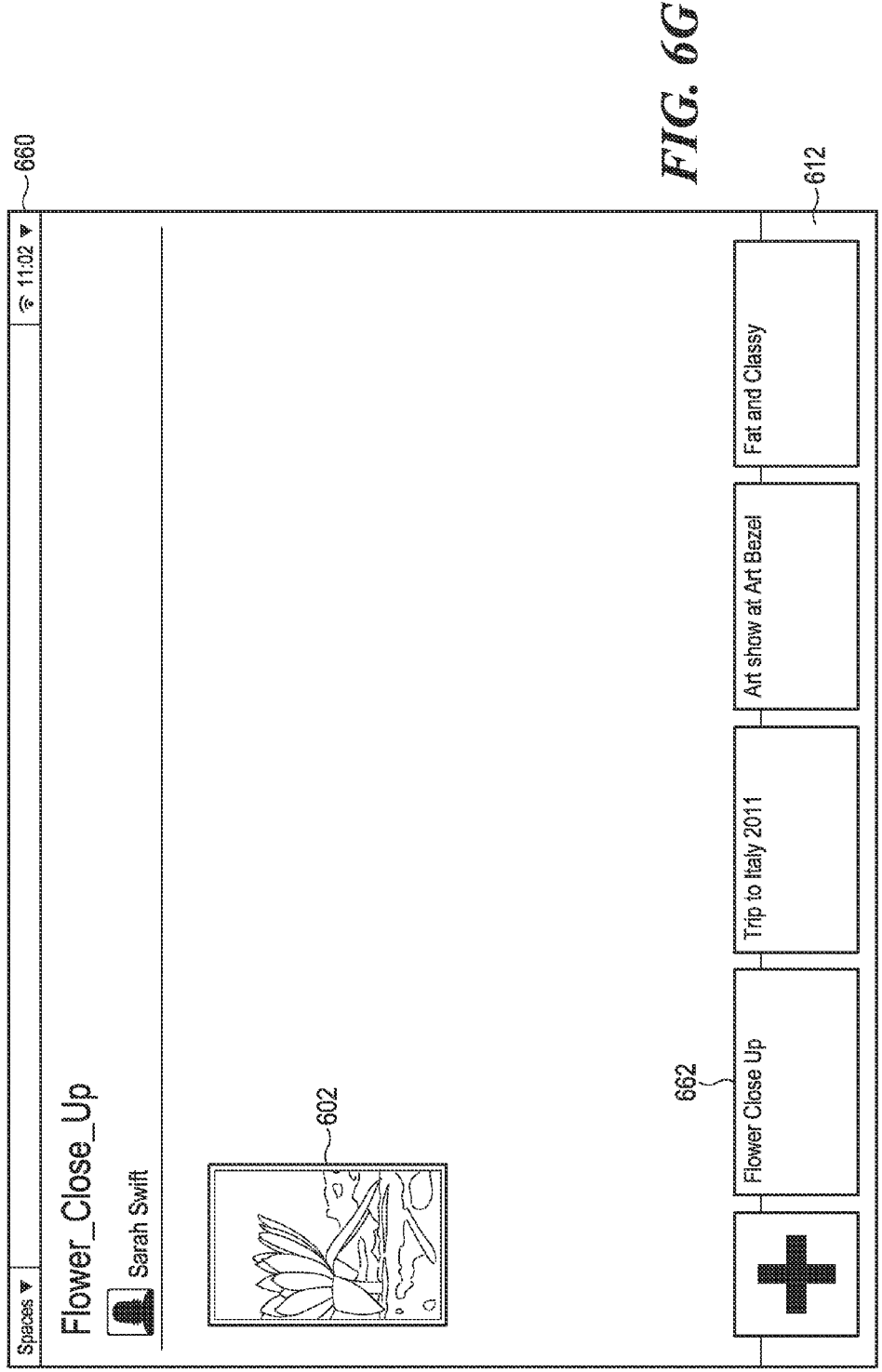
FIG. 6G is a diagram of an example interface in which a photo from a photos application has been added to a new shared space.

FIG. 6G is a diagram of an example interface 660 in which a photo 602 from a photos application has been added to a new shared space. In response to the user releasing photo 602 on the icon 614 representing the new space, the device has created a new space using the name of the photo 602 ("Flower_Close_Up") and opened the new space in a full screen view. As illustrated, the space currently includes only one member, Sarah Swift, who is the user who created the space. Furthermore, the device has updated the panel of icons 612 to include an icon 662 labeled "Flower Close Up."

FIG. 6H is a diagram of an example interface 670 including a pop-up menu 672 for enabling a user to add a photo 602 to a selected shared space 674. As illustrated, the photos application is currently in a full screen view in which photo 602 is the only displayed photo. In response to a selection of an icon 671 in the system tray, the device has displayed a pop-up menu 672 including a listing of identifiers for each shared space maintained by the data sharing application. In response to the user's selection of entry 674 corresponding to the "Trip to Italy 2011" space, the device may add the photo 602 to the space and display the space in full screen mode, as illustrated in FIG. 6E.

Figure 6I:
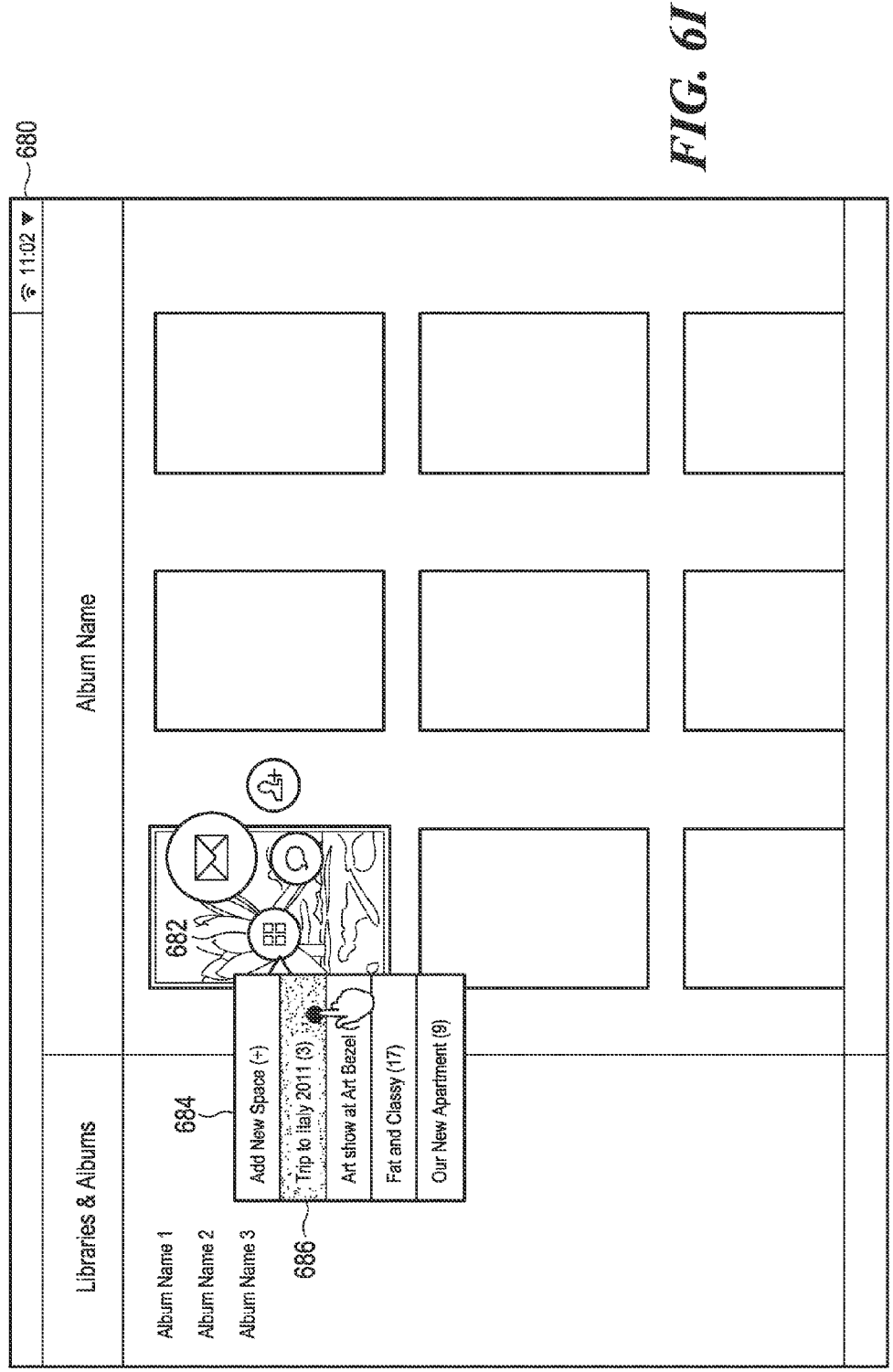
FIG. 6I is a diagram of an example interface including another pop-up menu for enabling a user to add a photo to a selected shared space.

FIG. 6I is a diagram of an example interface 680 including another pop-up menu 682 for enabling a user to add a photo 602 to a selected shared space 686. In the illustration, the user has selected and held photo 602 for a predetermined period of time and, in response, the device has initially displayed pop-up menu 682, which includes a group of four icons, where each icon corresponds to a particular function. The icon on the left is an icon for the function of adding the selected UI object to one of the shared spaces managed by the data sharing application.

In response to the user's selection of the icon for the spaces function in pop-up menu 682, the device has displayed a listing 684 including each space available in the data sharing application. In response to the user's selection of entry 686 corresponding to the "Trip to Italy 2011" space, the device may then add the photo 602 to the space and display the space in full screen mode, as illustrated in FIG. 6E.

Figure 7A:
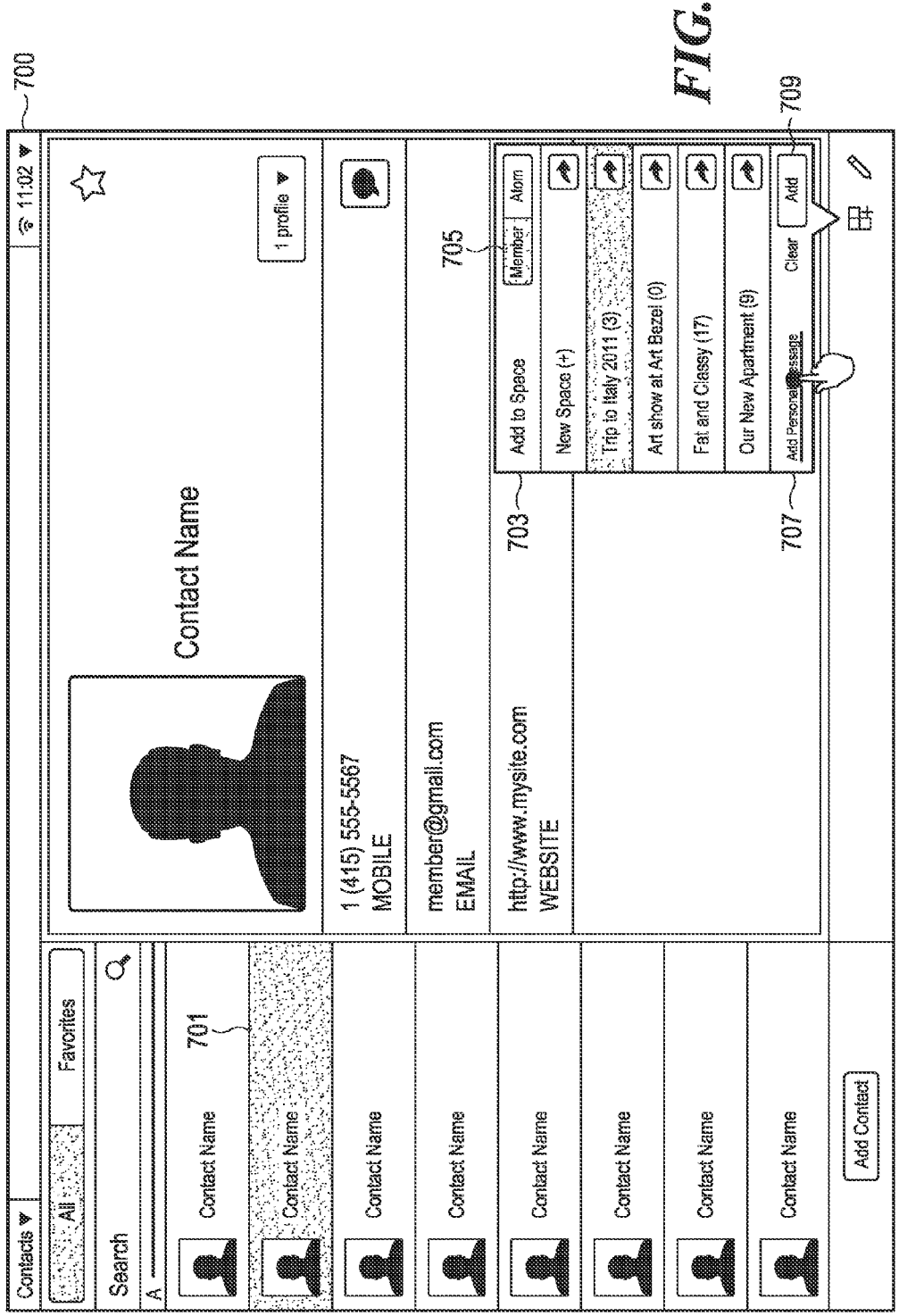
FIG. 7A is a diagram of an example interface including a pop-up menu for enabling a user to add a contact from a contacts application to a shared space.

FIG. 7A is a diagram of an example interface 700 including a pop-up menu 703 for enabling a user to add a contact 701 from a contacts application to a shared space. As illustrated, the user has selected a space icon in the bottom right corner of interface 700 and the device has therefore displayed a pop-up menu 703 including a listing of each space available in the data sharing application. In response, the user has selected "Trip to Italy 2011" within menu 703 and specified that the contact should be added as a "Member" using selector 705 (rather than as an "Atom" or UI object).

Figure 7B:
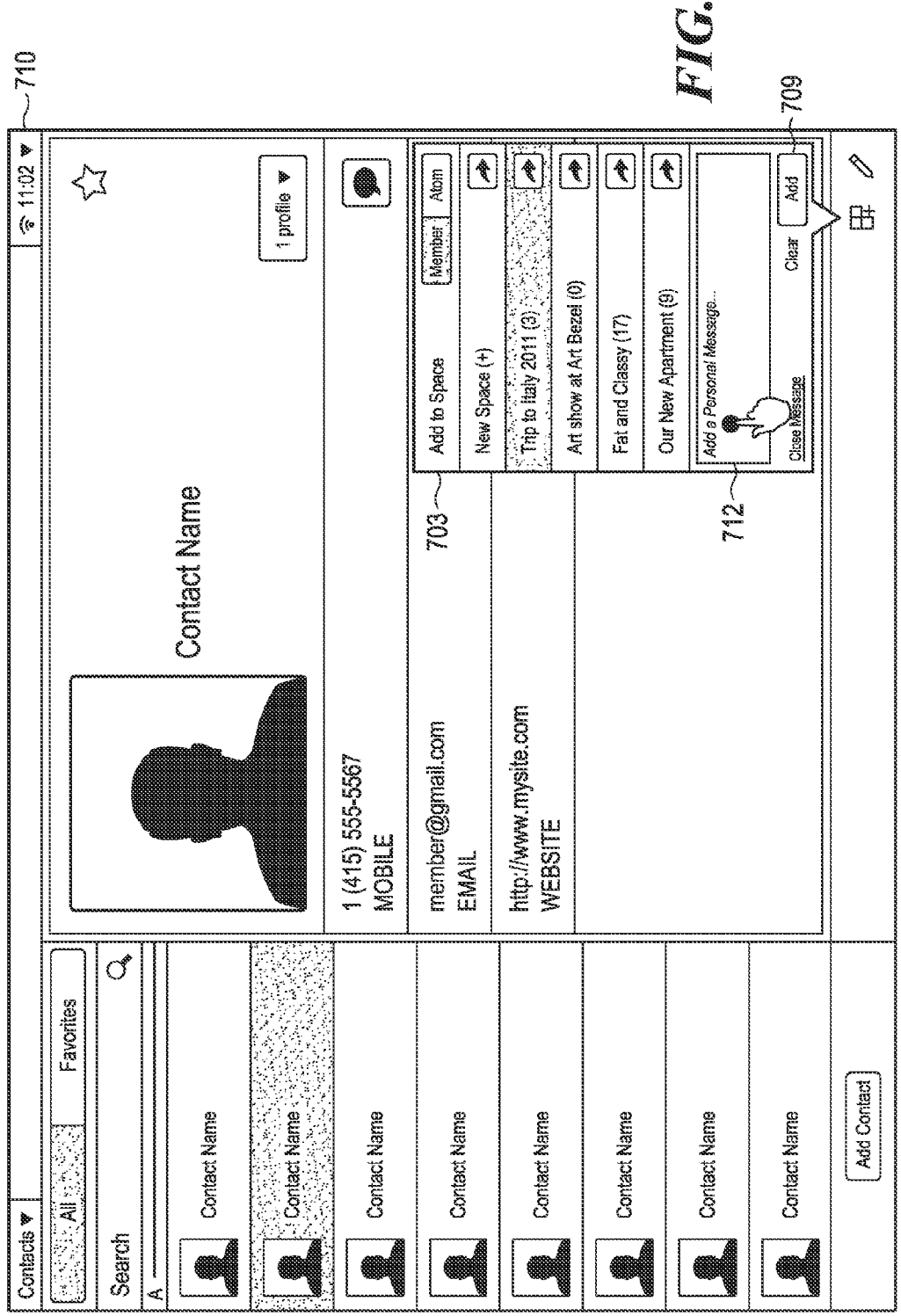
FIG. 7B is a diagram of an example interface including a pop-up menu for adding a personal message to an invitation to join a shared space.

FIG. 7B is a diagram of an example interface 710 including a pop-up menu 703 for adding a personal message to an invitation to join a shared space. In response to the user selecting personal message button 707 in FIG. 7A, the device has displayed a personal message textbox 712 for enabling the user to add a message to the invitation to be sent to each selected contact 701. In response to receiving entry of a personal message and a selection of add button 709, the device may then transmit the invitation and the personal message to the other user(s) via a server in communication with the operating system. Note that, although only a single contact 701 is selected in FIG. 7B, the device may transmit multiple invitations simultaneously based on selection of multiple contacts within the contacts application.

Figure 7C:
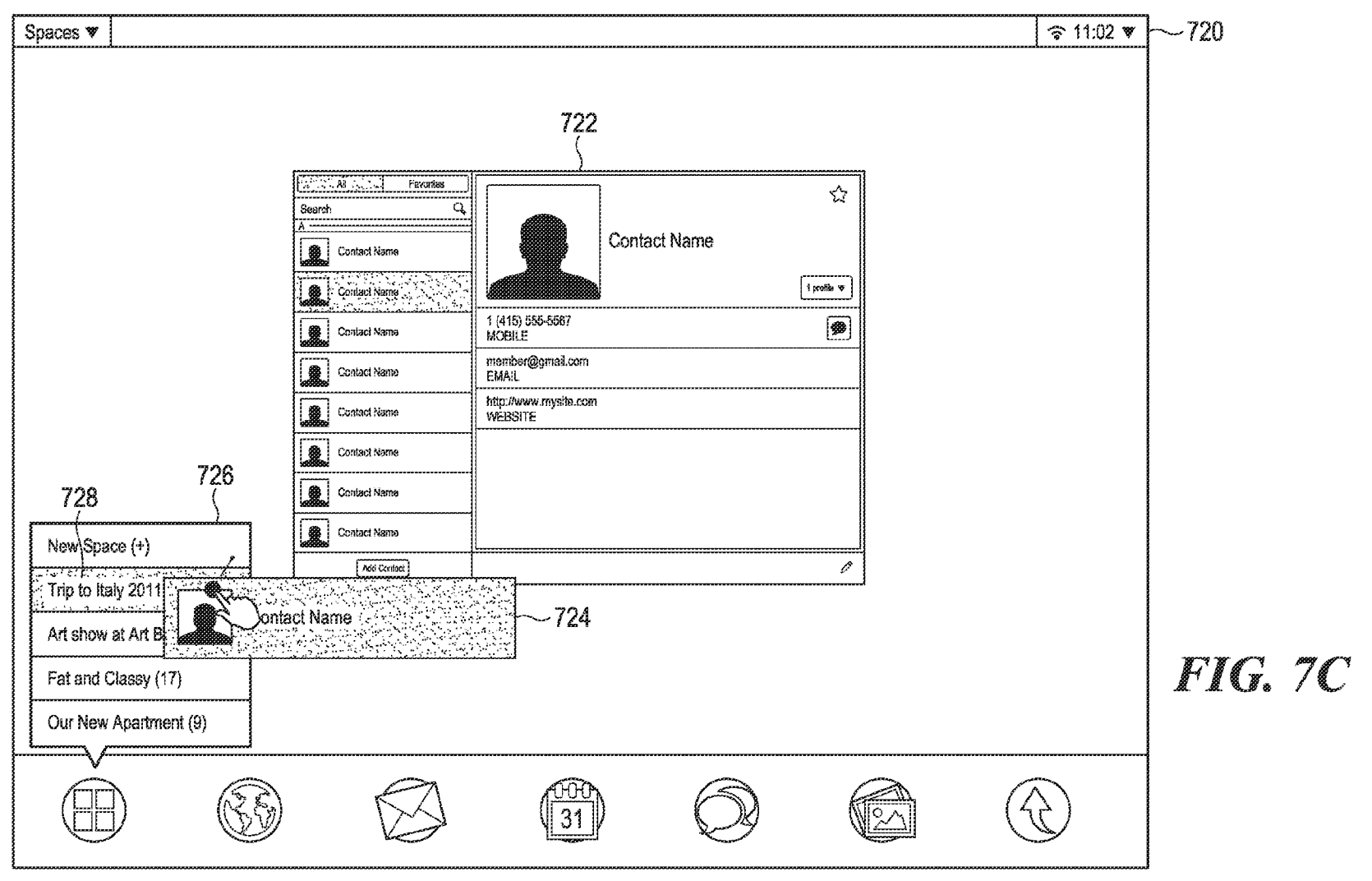

FIG. 7C is a diagram of an example interface 720 in which a user has moved a contact UI object 724 from a contacts application 722 onto an icon 728 representing a particular shared space. As an alternative to selecting an entry in the pop-up menu 703 of FIGS. 7A & 7B, the user may instead add a member to a space by selecting the contact UI object 724 within the contacts application 722 and dragging the object 724 to an entry 728 within pop-up menu 726.

More specifically, in response to a held touch of a contact within the contacts application 722, the device has switched the contacts application 722 to a windowed mode and outputted a thumbnail image of the contact UI object 724. The user has then dragged the contact UI object 724 over the spaces icon in the lower left corner, which has triggered the display of pop-up menu 726, which includes an identifier of each space available in the data sharing application. Finally, the user has dragged the contact 724 over the "Trip to Italy 2011" entry 728. Note that other implementations may use a panel of icons, such as panel 612 illustrated in FIG. 6B, to enable the user to drag and drop contact UI object 724.

Figure 7D:
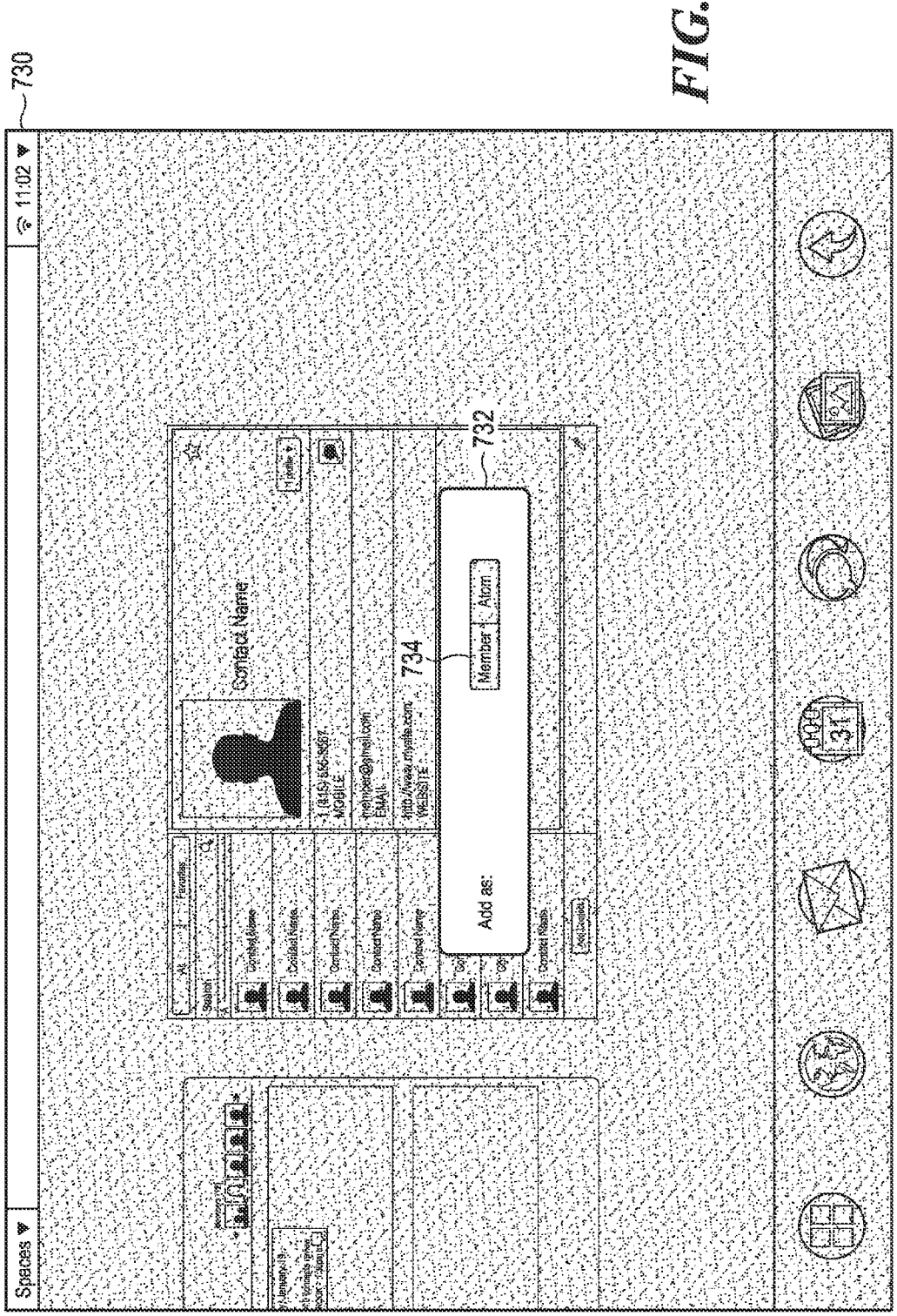
FIG. 7D is a diagram of an example interface for determining whether the user desires to add a contact to a shared space as a user granted access or, alternatively, as a user interface object.

FIG. 7D is a diagram of an example interface 730 for determining whether the user desires to add a contact 724 to a shared space as a user granted access or, alternatively, as a user interface object. In response to the release of a contact UI object 724 on an entry 728 in pop-up menu 726, the device may display the interface 730, including menu 732 with selector 734. The user may add the contact to the shared space as a member to be granted access by selecting "Member" using selector 734. Alternatively, the user may add the contact to the shared space as a UI object by selecting "Atom" using selector 734.

FIG. 7E is a diagram of an example interface 740 in which a user has moved a contact 742 from a contacts application to a shared space 744 indicating a desire to add the contact as a user interface object. As illustrated, the user has selected a contact within the displayed contact application, held the selection to trigger the display of a thumbnail for the contact UI object 742, and dragged the contact UI object 742 to a window 744 of the space, "Trip to Italy 2011." The user may then add the contact to the space as a UI object by releasing the object 742 within the portion of window 744 including UI objects (rather than releasing the object 742 within the member list, as described in connection with FIG. 7F).

Figure 7F:
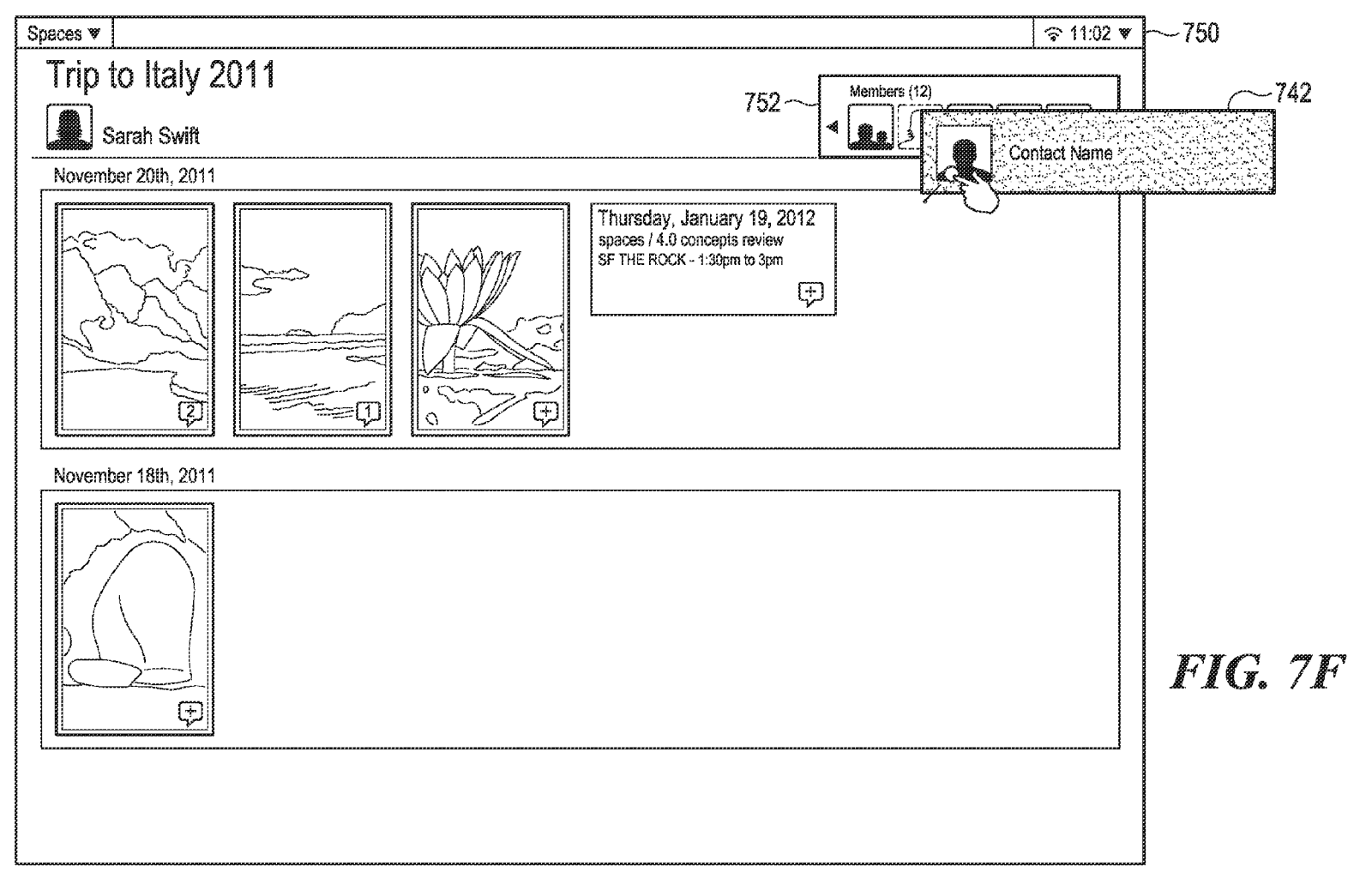

FIG. 7F is a diagram of an example interface 750 in which a user has moved a contact 742 from a contacts application to a shared space indicating a desire to add the contact 742 as a user granted access to the space. As illustrated, the user has dragged contact UI object 742 into a position on top of the member list 752. In response to the user releasing the contact UI object 742 on member list 752, the device may then add the corresponding contact as a member of the space, such that an invitation to join the space is pushed to the device of the contact.

Figure 8:
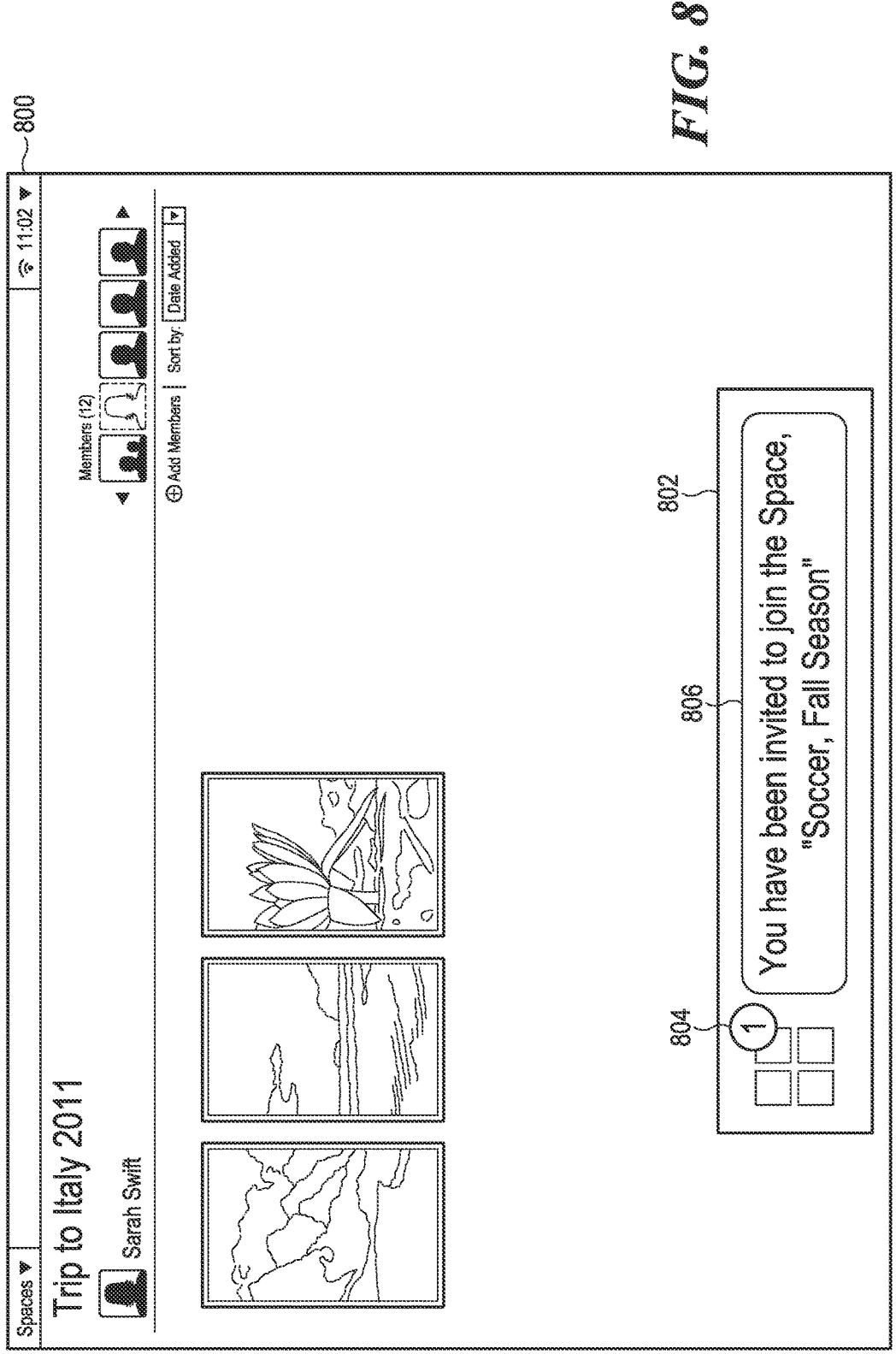
FIG. 8 is a diagram of an example interface in which a notification has been displayed to invite the user to join a shared space controlled by another user.

FIG. 8 is a diagram of an example interface 800 in which a notification 802 has been displayed to invite the user to join a shared space controlled by another user. As illustrated, the user is currently viewing the shared space entitled, "Trip to Italy 2011." A user of another device has added Sarah Swift to the space entitled, "Soccer, Ages 5-6, Fall Season" and Sarah's device has received an invitation to join the space.

In response, the device has outputted notification 802 overlaid on the interface 800. As illustrated, notification 802 includes a spaces icon 804, which includes the number "1", indicating that a total of one notification has been received for the data sharing application. Notification 802 also includes text 806 that informs Sarah that she has been invited to join the space. By selecting notification 802 with a touch, click, or other input, the user may trigger an additional dialog that enables the user to join the shared space. As an alternative, notification 802 could instead include a user interface element (e.g., a button labeled "Join") for enabling the user to join the shared space by selecting the element within the notification 802.

The foregoing disclosure describes a number of example embodiments for enabling users to share UI objects from various applications using a data sharing application that provides a group of shared spaces. For example, some embodiments enable a user to share UI objects while retaining the functionality of the UI objects within the shared space. In addition, various user interfaces described herein enable the user to easily create a shared space, add objects to the shared space, share the space with other users, and join shared spaces managed by other users. Additional embodiments and advantages of such embodiments will be apparent to those of skill in the art upon reading and understanding the foregoing description.

We claim:

1. A computing device comprising:
 a processor to:
  execute a data sharing application that provides a plurality of shared spaces, each shared space enabling a user of the computing device to share functional user interface (UI) objects with other users;
  receive one or more user commands to transfer a respective functional UI object from each of a plurality of corresponding applications executing on the computing device to a particular shared space, wherein each functional UI object implements associated functionality from a corresponding application of the plurality of corresponding applications;
  create, in response to receiving the one or more user commands to transfer a respective functional UI object, a data object for each functional UI object of the one or more transfer commands for the transfer to the particular shared space, wherein each data object as created for the transfer to the particular shared space includes a data construct that specifies a type of a respective functional UI object and includes executable code that executes functionality of the respective functional UI object to retain functionality from the corresponding application within the shared space;
  display a transferred functional UI object instance within the particular shared space for each created data object of the functional UI objects of the one or more transfer commands, wherein each displayed functional UI object instance retains the associated functionality from the corresponding application within the shared space using respective code of the data object for each functional UI object; and share the particular shared space, including each transferred functional UI object and the associated functionality, with a plurality of users granted access to the particular shared space by the user.

2. The computing device of claim 1, wherein the one or more user commands to transfer each respective functional UI object includes a drag and drop command by which the respective functional UI object is moved from a window of the corresponding application to a target associated with the particular shared space.

3. The computing device of claim 2, wherein:
the processor is further configured to display a panel of icons, each icon corresponding to one of the plurality of shared spaces, and
the target associated with the particular shared space is the icon corresponding to the particular shared space.

4. The computing device of claim 1, wherein:
the processor is further configured to display, in response to a held activation of a particular functional UI object within the corresponding application, a pop-up menu listing an identifier for each of the plurality of shared spaces, and
a user command of the one or more user commands to transfer the particular functional UI object to the particular shared space is a selection of the identifier corresponding to the particular shared space from the pop-up menu.

5. The computing device of claim 1, wherein the processor is configured to grant access to the particular shared space to a target user in response to a command to grant access provided by the user via a contacts application.

6. The computing device of claim 5, wherein:
the processor is configured to display a pop-up menu listing an identifier for each of the plurality of shared spaces while the contacts application is open, and
the command to grant access is a selection of the identifier corresponding to the particular shared space from the pop-up menu while the target user is selected within the contacts application.

7. The computing device of claim 5, wherein the command to grant access to the target user is a drag and drop command by which a functional UI object corresponding to the target user is dragged from the contacts application to the particular shared space within the data sharing application.

8. The computing device of claim 1, wherein the processor is further configured to:
display a pop-up notification that indicates to the user that another user has granted the user access to a shared space controlled by the other user;
receive, from the user, a command to obtain access to the shared space controlled by the other user;
add the shared space controlled by the other user to the data sharing application; and
synchronize, from a remote server, all functional UI object instances contained in the shared space controlled by the other user for access on the computing device via the data sharing application.

9. A non-transitory machine-readable storage medium encoded with instructions executable by a processor of a computing device for sharing functional UI objects, the machine-readable storage medium comprising:

instructions for executing a data sharing application including a shared space for enabling a user of the computing device to share functional user interface (UI) objects;
instructions for receiving a selection of users to be granted access to the shared space by the user;
instructions for receiving a plurality of user commands to transfer respective functional UI objects from each of a plurality of corresponding applications to the shared space, wherein each functional UI object implements associated functionality from a corresponding application of the plurality of corresponding applications;
instructions for creating, in response to receiving user commends to transfer a respective functional UI object, a data object for each functional UI object of the one or more transfer commands for the transfer to the shared space, wherein each data object as created for the transfer to the particular shared space includes a data construct that specifies a type of a respective functional UI object and includes executable code that executes functionality of the respective functional UI object to retain functionality from the corresponding application within the shared space;
instructions for displaying a transferred functional UI object instance for each created data object of the functional UI objects of the plurality of user transfer commands within the shared space, wherein each displayed functional UI object instance executes functionality transferred from the corresponding application using respective code of the data object for the functional UI object; and
instructions for providing each transferred functional UI object to a remote server to be shared with each user granted access to the shared space.

10. The non-transitory machine-readable storage medium of claim 9, wherein the instructions for receiving the selection of users to be granted access comprise:
instructions for receiving a selection of a target user to be granted access to the shared space via a command by which a UI object corresponding to the target user is dragged and dropped from a contacts application.

11. The non-transitory machine-readable storage medium of claim 9, wherein the instructions for receiving the plurality of user commands to transfer a respective functional UI object comprise:
instructions for displaying a panel of icons, each icon corresponding to one of a plurality of shared spaces; and
instructions for adding the respective functional UI object instance to the shared space in response to a command by which the respective functional UI object is dragged from a window of the corresponding application and dropped on the icon corresponding to the shared space.

12. A method for sharing functional user interface (UI) objects, the method comprising:
executing, by a computing device, a data sharing application that provides a plurality of shared spaces, each shared space enabling a user of the computing device to share functional user interface (UI) objects with other users;
receiving one or more user commands to transfer a respective functional UI object from each of a plurality of corresponding applications executing on the computing device to a particular shared space, wherein each functional UI object implements associated functionality from a corresponding application of the plurality of corresponding applications;

creating, in response to receiving the one or more user commands to transfer a respective functional UI object, a data object for each functional UI object of the one or more transfer commands for the transfer to the particular shared space, wherein each data object as created for the transfer to the particular shared space includes a data construct that specifies a type of a respective functional UI object and includes executable code that executes functionality of the respective functional UI object to retain functionality from the corresponding application within the shared space;

displaying a transferred functional UI object instance within the particular shared space for each created data object of the functional UI objects of the one or more transfer commands, wherein each displayed functional UI object instance retains the associated functionality from the corresponding application within the shared application using respective code of the data object for each functional UI object;

receiving a selection of users to be granted access to the particular shared space based on a selection provided by the user via a contacts application; and sharing the particular shared space, including each transferred functional UI object and the associated functionality, with the users granted access to the particular shared space.

13. The method of claim 12, wherein receiving the selection of users to be granted access comprises:
receiving a selection of each user to be granted access to the particular shared space via a respective command by which a UI object corresponding to the user to be granted access is dragged and dropped from the contacts application into the particular shared space.

14. The method of claim 12, wherein receiving the one or more user commands to transfer each respective functional UI object comprises:
displaying a panel of icons, each icon corresponding to one of the plurality of shared spaces; and
adding the respective functional UI object instance to the particular shared space in response to a command by which the respective functional UI object is dragged from a window of the corresponding application and dropped on the icon corresponding to the particular shared space.

* * * * *